United States Patent
Bean et al.

(10) Patent No.: US 11,164,302 B2
(45) Date of Patent: Nov. 2, 2021

(54) SYSTEMS AND METHODS FOR CLASSIFYING IMAGES OF AN IMPRINTED FILM

(71) Applicant: CANON KABUSHIKI KAISHA, Tokyo (JP)

(72) Inventors: Kathryn Brenda Bean, Liberty Hill, TX (US); Teresa Perez Estrada, Pflugerville, TX (US); Edward Brian Fletcher, Austin, TX (US); Mehul N. Patel, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 16/535,707

(22) Filed: Aug. 8, 2019

(65) Prior Publication Data

US 2021/0042906 A1 Feb. 11, 2021

(51) Int. Cl.
   *G06T 7/00* (2017.01)
   *G06T 7/11* (2017.01)
   *G06K 9/46* (2006.01)
   *G06K 9/62* (2006.01)

(52) U.S. Cl.
   CPC ............ *G06T 7/0004* (2013.01); *G06K 9/46* (2013.01); *G06K 9/6202* (2013.01); *G06T 7/11* (2017.01); *G06T 2207/10004* (2013.01)

(58) Field of Classification Search
   CPC combination set(s) only.
   See application file for complete search history.

(56) References Cited

U.S. PATENT DOCUMENTS

| | | |
|---|---|---|
| 6,936,194 B2 | 8/2005 | Watts |
| 7,157,036 B2 | 1/2007 | Choi et al. |
| 8,066,930 B2 | 11/2011 | Sreenivasan et al. |
| 8,076,386 B2 | 12/2011 | Xu et al. |
| 8,349,241 B2 | 1/2013 | Sreenivasan et al. |
| 2005/0185169 A1 | 8/2005 | McMackin et al. |

(Continued)

FOREIGN PATENT DOCUMENTS

JP 2009/145285 A 7/2009

OTHER PUBLICATIONS

Opencv dev team, OpenCV 2.4.13.7 documentation, OpenCV API Reference, Image Processing, Feature Detection, Jul. 12, 2019, <URL:https://web.archive.org/web/20190712164806/https://docs.opencv.org/2.4/modules/imgproc/doc/feature_detection.html>.

(Continued)

*Primary Examiner* — Oneal R Mistry
*Assistant Examiner* — Nicolas James Boyajian
(74) *Attorney, Agent, or Firm* — Daniel Ratoff

(57) ABSTRACT

Systems and processes for analyzing an image. Analyzing the image may comprise selecting a computer vision parameter for an image feature identification process. The image feature identification process may identify at least one feature in the image when using the computer vision parameter. Analyzing the image may further comprise segmenting the image into a region of interest T and a background region B. Analyzing the image may further comprise calculating a set of statistical values about the region of interest T of the image. Analyzing the image may further comprise classifying the image based on both the computer vision parameter and the set of statistical values as one of either: a defect containing image or a defect free image.

17 Claims, 13 Drawing Sheets

(56) References Cited

U.S. PATENT DOCUMENTS

| | | | | |
|---|---|---|---|---|
| 2008/0013822 | A1* | 1/2008 | Pai | G01N 21/9501 |
| | | | | 382/145 |
| 2014/0043467 | A1 | 2/2014 | Yamashita | |
| 2016/0123897 | A1* | 5/2016 | Pavani | G06T 7/001 |
| | | | | 348/126 |
| 2019/0096057 | A1* | 3/2019 | Allen | G06T 7/0008 |
| 2019/0333205 | A1* | 10/2019 | Fang | G05B 19/406 |
| 2020/0238248 | A1* | 7/2020 | Mitchell | B01J 19/0093 |

OTHER PUBLICATIONS

Opencv dev team, OpenCV 2.4.13.7 documentation, OpenCV API Reference, Image Processing, Structural Analysis and Shape Descriptors, Jul. 12, 2019, <URL:https://web.archive.org/web/20190712170314/https://docs.opencv.org/2.4/modules/imgproc/doc/structural_analysis_and_shape_descriptors.html>.

Opencv dev team, OpenCV 2.4.13.7 documentation, OpenCV API Reference, Machine Learning, Random Trees, Mar. 25, 2019, <URL:https://web.archive.org/web/20190325101434/https://docs.opencv.org/2.4/modules/ml/doc/random_trees.html>.

Th SciPy community, SciPy v1.3.0 Reference Guide, SciPy Tutorial, Optimization (scipy.optimize), Jun. 15, 2019, <URL:https://web.archive.org/web/20190615181831/https://docs.scipy.org/doc/scipy/reference/tutorial/optimize.html>.

Nobuyuki Otsu, A Threshold Selection Method from Gray-Level Histograms, IEEE Transactions on Systems, Man, and Cybernetics, Jan. 1979, 9(1):62-66, IEEE, Piscataway, NJ, 1979.

Kathryn Brenda Bean, Teresa Perez Estrada, Automatic Defect Analyzer for Nanoimprint Lithography Using Image Analysis, U.S. Appl. No. 16/227,614, filed Dec. 20, 2018.

The SciPy community, SciPy v1.3.0 Reference Guide, SciPy Tutorial, 1.11. Ensemble methods, May 30, 2019, <URL:https://web.archive.org/web/20190530091155/https://scikit-learn.org/stable/modules.ensemble.html>.

Asad A. Ul Haq, Keren Wang, Dragan Djurdjanovic, Feature Construction for Dense Inline Data in Semiconductor Manufacturing Processes, IFAC-PapersOnLine, 49(28):274-279, Elsevier Ltd., London UK, 2016.

* cited by examiner

SYSTEMS AND METHODS FOR CLASSIFYING IMAGES OF AN IMPRINTED FILM

BACKGROUND OF THE INVENTION

Technical Field

The present disclosure relates to systems and methods for automated detection and classification of defects in an image of an imprinted film on a semiconductor substrate.

Description of The Related Art

Nano-fabrication includes the fabrication of very small structures that have features on the order of 100 nanometers or smaller. One application in which nano-fabrication has had a sizeable impact is in the fabrication of integrated circuits. The semiconductor processing industry continues to strive for larger production yields while increasing the circuits per unit area formed on a substrate. Improvements in nano-fabrication include providing greater process control and/or improving throughput while also allowing continued reduction of the minimum feature dimensions of the structures formed.

One nano-fabrication technique in use today is commonly referred to as nanoimprint lithography. Nanoimprint lithography is useful in a variety of applications including, for example, fabricating one or more layers of integrated devices by shaping a film on a substrate. Examples of an integrated device include but are not limited to CMOS logic, microprocessors, NAND Flash memory, NOR Flash memory, DRAM memory, MRAM, 3D cross-point memory, Re-RAM, Fe-RAM, STT-RAM, MEMS, and the like. Exemplary nanoimprint lithography systems and processes are described in detail in numerous publications, such as U.S. Pat. Nos. 8,349,241, 8,066,930, and 6,936,194, all of which are hereby incorporated by reference herein.

The nanoimprint lithography technique disclosed in each of the aforementioned patents describes the shaping of a film on a substrate by the formation of a relief pattern in a formable material (polymerizable) layer. The shape of this film may then be used to transfer a pattern corresponding to the relief pattern into and/or onto an underlying substrate.

The shaping process uses a template spaced apart from the substrate and the formable material is applied between the template and the substrate. The template is brought into contact with the formable material causing the formable material to spread and fill the space between the template and the substrate. The formable liquid is solidified to form a film that has a shape (pattern) conforming to a shape of the surface of the template that is in contact with the formable liquid. After solidification, the template is separated from the solidified layer such that the template and the substrate are spaced apart.

The substrate and the solidified layer may then be subjected to additional semiconductor fabrication processes, such as etching processes, to transfer an image into the substrate that corresponds to the pattern in one or both of the solidified layer and/or patterned layers that are underneath the solidified layer. The patterned substrate can be further subjected to known steps and processes for device (article) fabrication, including, for example, curing, oxidation, layer formation, deposition, doping, planarization, etching, formable material removal, dicing, bonding, and packaging, and the like.

SUMMARY OF THE INVENTION

A first embodiment, may be a method of analyzing an image. The method may comprise selecting a computer vision parameter for an image feature identification process. The image feature identification process may identify at least one feature in the image when using the computer vision parameter. The method may further comprise segmenting the image into a region of interest T and a background region B. The method may further comprise calculating a set of statistical values about the region of interest T of the image. The method may further comprise classifying the image based on both the computer vision parameter and the set of statistical values as one of either: a defect containing image or a defect free image.

In a first embodiment, the image may be of a portion of an imprinted film on a substrate.

In a first embodiment, the defect containing image may be further classified as one of: an extrusion type image containing a representation of at least one extrusion defect; a non-fill type image containing a representation of at least one non-fill defect; and a mixed type image containing representations of the at least one non-fill defect and the at least one extrusion defect.

In a first embodiment, classifying the image may make use of an artificial intelligence model that uses: the computer vision parameter and set of statistical values as inputs for classification; and uses a set of input images that have been previously classified for training the artificial intelligence model.

In a first embodiment, the artificial intelligence model is a random forest model.

In a first embodiment, the set of statistical values may include one or more of:

$$R_1 = \max_{across\ i} \left( \max_{feature\ at\ location\ i} (ROIT) - \median_{feature\ at\ location\ i} (ROIT) \right)$$

$$R_2 = \max_{across\ i} \left( \median_{feature\ at\ location\ i} (ROIT) - \min_{feature\ at\ location\ i} (ROIT) \right)$$

$$R_3 = \min_{across\ i} \left( \median_{feature\ at\ location\ i} (ROIT) \right)$$

$$R_4 = \max_{across\ i} \left( \median_{feature\ at\ location\ i} (ROIT) \right)$$

$$R_5 = \median_{across\ multiple\ images} \left( \max_{entire\ ROIT} (ROIT) - \median_{entire\ ROIT} (ROIT) \right)$$

$$R_6 = \median_{across\ multiple\ images} \left( \median_{entire\ ROIT} (ROIT) - \min_{entire\ ROIT} (ROIT) \right)$$

$$R_7 = \median_{across\ multiple\ images} (R_3)$$

$$R_8 = \median_{across\ multiple\ images} (R_4).$$

In a first embodiment, the image feature identification process may include a Canny edge detection process and the computer vision parameter may be a canny threshold.

In a first embodiment, selecting the computer vision parameter may include steps:
(a) performing the image feature identification process on the image with a tentative computer vision parameter to identify a tentative number of connected features in the image;
(b) in a first case wherein the tentative number of connected features meets a number of features criteria, setting the computer vision parameter to the tentative computer vision parameter;

(c) in a second case wherein the tentative number of connected features does not meet the number of features criteria, performing steps (a) and (b) with new tentative number of connected features until new tentative number of connected features meets the number of features criteria.

In a first embodiment, the number of features criteria may be that the tentative number of connected features is 1.

A first embodiment, may further comprise before segmenting the image receiving information about the image identifying a type of feature that is in the region of interest T. The type of feature may be selected from a group consisting of: a mark; a straight edge; and a curved edge.

In a first embodiment, segmenting the image may further comprise the steps of:
estimating a feature location of the type of feature in the image;
forming a set of statistical values associated with a set of offset locations that are offset from the feature location;
for each statistical value in the set of statistical values, calculating a particular statistical value of a particular portion of the image in a shape corresponding to the type of feature, at each offset location among the set of offset locations;
calculating an absolute difference in statistical values between neighboring offset locations for each offset location among the set of offset location;
identifying a subset of offset locations $S_T$ of the set of offset locations as those in which the absolute difference in statistical values is above a threshold; and
setting bounds of the region of interest in the image as the shape corresponding to the type of feature at the subset of offset locations $S_T$.

In a first embodiment, the shape corresponding to the type of feature may be selected from the group consisting of: a straight edge; a rectangle; a square; a corner; and a sigmoid curve.

A first embodiment, may further comprise a method of generating process parameters for an imprinting process comprising:
(a) imprinting a plurality of films on one or more substrates with a set of imprinting parameters;
(b) obtaining a set of images of the plurality of films;
(c) generating a set of classifications of the imprinted films by analyzing the set of images in accordance with claim 1;
(d) determining if the set of classifications of the imprinted films meet the quality goal;
(e) in a first case wherein the set of classifications of the imprinted films do not meet the quality goal, determining new imprinting parameters based on the set image classifications and repeating processes (a)-(e) until the imprinting films meet the quality goal;
(e) in a first case wherein the set of classifications of the imprinted films do not meet the quality goal, adjusting the imprinting parameters based on the set image classifications and repeating processes (a)-(e) until the imprinting films meet the quality goal; and
(f) in a second case wherein the set of classifications of the imprinted films do meet the quality goal, outputting the imprinting parameters in which the set of classifications of the imprinted films do meet the quality goal as production imprinting parameters.

A first embodiment, may further comprise a method of manufacturing an article using the outputted production imprinting parameters. The method of manufacturing an article may further comprise: imprinting a plurality of production films on a plurality of production substrates with a set of production imprinting parameters; and processing the plurality of production substrates to produce a plurality of the articles.

A second embodiment, may be a system comprising: a processor; and a memory. The memory may contain instructions that, when executed by the processor, cause the processor to perform operations comprising: selecting a computer vision parameter for an image feature identification process, wherein the image feature identification process identifies at least one feature in an image when using the computer vision parameter; segmenting the image into a region of interest T and a background region B; calculating a set of statistical values about the region of interest T of the image; classifying the image based on both the computer vision parameter and the set of statistical values as one of either: a defect containing image or a defect free image.

In a second embodiment, the image is of a portion of an imprinted film. The system may further comprise a nanoimprint lithography system configured to form the imprinted film on a substrate.

In a second embodiment, imprinting parameters used by the nanoimprint lithography system to produce a production imprinted film on a plurality of production substrates may be based on the classification of the image.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

So that features and advantages of the present invention can be understood in detail, a more particular description of embodiments of the invention may be had by reference to the embodiments illustrated in the appended drawings. It is to be noted, however, that the appended drawings only illustrate typical embodiments of the invention and are therefore not to be considered limiting of its scope, for the invention may admit to other equally effective embodiments.

Figure 1:
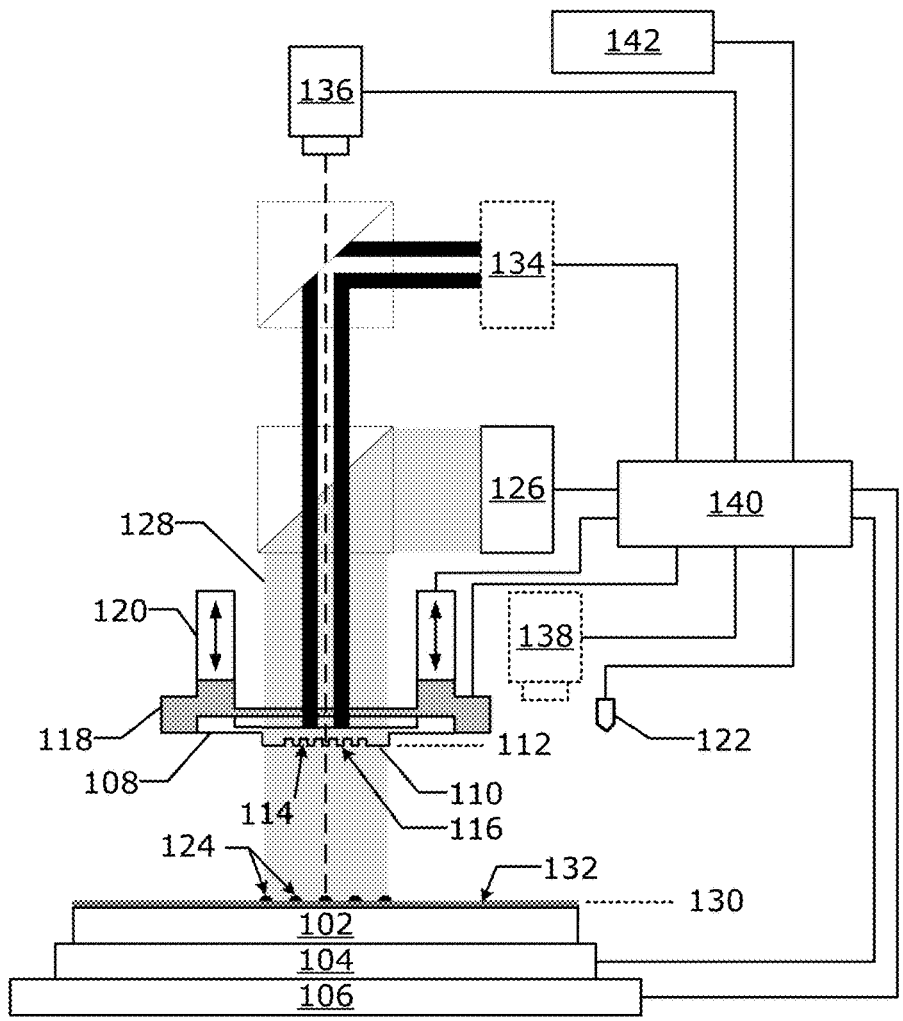
FIG. 1 is an illustration of an exemplary nanoimprint lithography system having a template with a mesa spaced apart from a substrate as used in an embodiment.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

The nanoimprinting lithography techniques and systems are used to shape a film on a substrate from a formable material. The shaping process includes bringing the template into contact with the formable material. During the shaping process the formable material spreads such that the formable material fills features, on both the substrate and the template. An imprinted film is formed on the substrate when the formable material between template and the substrate is cured. The template is then separated from the imprinted film.

Inspection processes and tools are then used to obtain inspection images of these imprinted films. The inspection images are representative of the state of the imprinted films. The imprinted films may include any number of: defects, imprinted features, and marks on imprinted and/or in the underlying substrate. The applicant has found that it is useful to identify and distinguish at least two types of defects (non-fill and extrusion) from features and marks that are found in these inspection images. These inspection images may be obtained under a variety of inspection conditions and the imprinted film may be obtained under a variety of imprinting conditions.

What is needed is an inspection method and/or system of identifying and distinguishing defects that is robust to changes in the imprinting conditions and to changes in the inspection conditions.

Nanoimprint System (Shaping System)

FIG. 1 is an illustration of a nanoimprint lithography system 100 in which an embodiment may be may be used in an embodiment. The nanoimprint lithography system 100 may be used to produce an imprinted (shaped) film on a substrate 102 that is inspected in and/or by an embodiment. The substrate 102 may be coupled to a substrate chuck 104. The substrate chuck 104 may be, but is not limited to, a vacuum chuck, pin-type chuck, groove-type chuck, electro-static chuck, electromagnetic chuck, and/or the like.

The substrate 102 and the substrate chuck 104 may be further supported by a substrate positioning stage 106. The substrate positioning stage 106 may provide translational and/or rotational motion along one or more of the x, y, z, θ, ψ, and φ-axes. The substrate positioning stage 106, the substrate 102, and the substrate chuck 104 may also be positioned on a base (not shown). The substrate positioning stage may be a part of a positioning system.

Spaced-apart from the substrate 102 is a template 108. The template 108 may include a body having a mesa (also referred to as a mold) 110 extending towards the substrate 102 on a front side of the template 108. The mesa 110 may have a patterning surface 112 thereon also on the front side of the template 108. The patterning surface 112, also known as a shaping surface, is the surface of the template that shapes the formable material 124. In an embodiment, the patterning surface 112 is planar and is used to planarize the formable material. Alternatively, the template 108 may be formed without the mesa 110, in which case the surface of the template facing the substrate 102 is equivalent to the mold 110 and the patterning surface 112 is that surface of the template 108 facing the substrate 102.

The template 108 may be formed from such materials including, but not limited to, fused-silica, quartz, silicon, organic polymers, siloxane polymers, borosilicate glass, fluorocarbon polymers, metal, hardened sapphire, and/or the like. The patterning surface 112 may have features defined by a plurality of spaced-apart template recesses 114 and/or template protrusions 116. The patterning surface 112 defines a pattern that forms the basis of a pattern to be formed on the substrate 102. In an alternative embodiment, the patterning surface 112 is featureless in which case a planar surface is formed on the substrate. In an alternative embodiment, the patterning surface 112 is featureless and the same size as the substrate and a planar surface is formed across the entire substrate.

Template 108 may be coupled to a template chuck 118. The template chuck 118 may be, but is not limited to, vacuum chuck, pin-type chuck, groove-type chuck, electro-static chuck, electromagnetic chuck, and/or other similar chuck types. The template chuck 118 may be configured to apply stress, pressure, and/or strain to template 108 that varies across the template 108. The template chuck 118 may include piezoelectric actuators which can squeeze and/or stretch different portions of the template 108. The template chuck 118 may include a system such as a zone based vacuum chuck, an actuator array, a pressure bladder, etc. which can apply a pressure differential to a back surface of the template causing the template to bend and deform.

The template chuck 118 may be coupled to an imprint head 120 which is a part of the positioning system. The imprint head may be moveably coupled to a bridge. The imprint head 120 may include one or more actuators such as voice coil motors, piezoelectric motors, linear motor, nut and screw motor, etc., which are configured to move the template chuck 118 relative to the substrate in at least the z-axis direction, and potentially other directions (e.g. x, y, θ, ψ, and φ-axes).

The nanoimprint lithography system 100 may further comprise a fluid dispenser 122. The fluid dispenser 122 may also be moveably coupled to the bridge. In an embodiment, the fluid dispenser 122 and the imprint head 120 share one or more or all positioning components. In an alternative embodiment, the fluid dispenser 122 and the imprint head 120 move independently from each other. The fluid dispenser 122 may be used to deposit liquid formable material 124 (e.g., polymerizable material) onto the substrate 102 in a pattern. Additional formable material 124 may also be added to the substrate 102 using techniques, such as, drop dispense, spin-coating, dip coating, chemical vapor deposition (CVD), physical vapor deposition (PVD), thin film deposition, thick film deposition, and/or the like prior to the formable material 124 being deposited onto the substrate 102. The formable material 124 may be dispensed upon the substrate 102 before and/or after a desired volume is defined between the mold 112 and the substrate 102 depending on design considerations. The formable material 124 may comprise a mixture including a monomer as described in U.S. Pat. Nos. 7,157,036 and 8,076,386, both of which are herein incorporated by reference.

Different fluid dispensers 122 may use different technologies to dispense formable material 124. When the formable material 124 is jettable, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

The nanoimprint lithography system 100 may further comprise a curing system that includes at least a radiation source 126 that directs actinic energy along an exposure path 128. The imprint head and the substrate positioning stage 106 may be configured to position the template 108 and the substrate 102 in superimposition with the exposure path 128.

The radiation source 126 sends the actinic energy along the exposure path 128 after the template 108 has made contact with the formable material 128. FIG. 1 illustrates the exposure path 128 when the template 108 is not in contact with the formable material 124, this is done for illustrative purposes so that the relative position of the individual components can be easily identified. An individual skilled in the art would understand that exposure path 128 would not substantially change when the template 108 is brought into contact with the formable material 124.

The nanoimprint lithography system 100 may further comprise a field camera 136 that is positioned to view the spread of formable material 124 after the template 108 has made contact with the formable material 124. FIG. 1 illustrates an optical axis of the field camera's imaging field as a dashed line. As illustrated in FIG. 1 the nanoimprint lithography system 100 may include one or more optical components (dichroic mirrors, beam combiners, prisms, lenses, mirrors, etc.) which combine the actinic radiation with light to be detected by the field camera. The field camera 136 may be configured to detect the spread of formable material under the template 108. The optical axis of the field camera 136 as illustrated in FIG. 1 is straight but may be bent by one or more optical components. The field camera 136 may include one or more of a CCD, a sensor array, a line camera, and a photodetector which are configured to gather light that has a wavelength that shows a contrast between regions underneath the template 108 that are in contact with the formable material, and regions underneath the template 108 which are not in contact with the formable material 124. The field camera 136 may be configured to gather monochromatic images of visible light. The field camera 136 may be configured to provide images of the spread of formable material 124 underneath the template 108, the separation of the template 108 from cured formable material, and can be used to keep track of the imprinting process. The field camera 136 may also be configured to measure interference fringes, which change as the formable material spreads 124 between the gap between the patterning surface 112 and the substrate surface 130.

The nanoimprint lithography system 100 may further comprise a droplet inspection system 138 that is separate from the field camera 136. The droplet inspection system 138 may include one or more of a CCD, a camera, a line camera, and a photodetector. The droplet inspection system 138 may include one or more optical components such as a lenses, mirrors, apertures, filters, prisms, polarizers, windows, adaptive optics, and/or light sources. The droplet inspection system 138 may be positioned to inspect droplets prior to the patterning surface 112 contacting the formable material 124 on the substrate 102.

The nanoimprint lithography system 100 may further include a thermal radiation source 134 which may be configured to provide a spatial distribution of thermal radiation to one or both of the template 108 and the substrate 102. The thermal radiation source 134 may include one or more sources of thermal electromagnetic radiation that will heat up one or both of the substrate 102 and the template 108 and does not cause the formable material 124 to solidify. The thermal radiation source 134 may include a spatial light modulator such as a digital micromirror device (DMD), Liquid Crystal on Silicon (LCoS), Liquid Crystal Device (LCD), etc., to modulate the spatio-temporal distribution of thermal radiation. The nanoimprint lithography system may further comprise one or more optical components which are used to combine the actinic radiation, the thermal radiation, and the radiation gathered by the field camera 136 onto a single optical path that intersects with the imprint field when the template 108 comes into contact with the formable material 124 on the substrate 102. The thermal radiation source 134 may send the thermal radiation along a thermal radiation path (which in FIG. 1 is illustrated as 2 thick dark edges) after the template 108 has made contact with the formable material 128. FIG. 1 illustrates the thermal radiation path when the template 108 is not in contact with the formable material 124, this is done for illustrative purposes so that the relative position of the individual components can be easily identified. An individual skilled in the art would understand that the thermal radiation path would not substantially change when the template 108 is brought into contact with the formable material 124. In FIG. 1 the thermal radiation path is shown terminating at the template 108, but it may also terminate at the substrate 102. In an alternative embodiment, the thermal radiation source 134 is underneath the substrate 102, and thermal radiation path is not combined with the actinic radiation and the visible light.

Prior to the formable material 124 being dispensed onto the substrate, a substrate coating 132 may be applied to the substrate 102. In an embodiment, the substrate coating 132 may be an adhesion layer. In an embodiment, the substrate coating 132 may be applied to the substrate 102 prior to the substrate being loaded onto the substrate chuck 104. In an alternative embodiment, the substrate coating 132 may be applied to substrate 102 while the substrate 102 is on the substrate chuck 104. In an embodiment, the substrate coating 132 may be applied by spin coating, dip coating, etc. In an embodiment, the substrate 102 may be a semiconductor wafer. In another embodiment, the substrate 102 may be a blank template (replica blank) that may be used to create a daughter template after being imprinted.

The nanoimprint lithography system 100 may include an imprint field atmosphere control system such as gas and/or vacuum system, an example of which is described in U.S. Patent Publication Nos. 2010/0096764 and 2019/0101823 which are hereby incorporated by reference. The gas and/or vacuum system may include one or more of pumps, valves, solenoids, gas sources, gas tubing, etc. which are configured to cause one or more different gases to flow at different times and different regions. The gas and/or vacuum system 36 may be connected to a first gas transport system that transports gas to and from the edge of the substrate 102 and controls the imprint field atmosphere by controlling the flow of gas at the edge of the substrate 102. The gas and/or vacuum system may be connected to a second gas transport system that transports gas to and from the edge of the template 108 and controls the imprint field atmosphere by controlling the flow of gas at the edge of the template 108. The gas and/or vacuum system may be connected to a third gas transport system that transports gas to and from the top of the template 108 and controls the imprint field atmosphere by controlling the flow of gas through the template 108. One or more of the first, second, and third gas transport systems may be used in combination or separately to control the flow of gas in and around the imprint field.

The nanoimprint lithography system 100 may be regulated, controlled, and/or directed by one or more processors 140 (controller) in communication with one or more components and/or subsystems such as the substrate chuck 104, the substrate positioning stage 106, the template chuck 118, the imprint head 120, the fluid dispenser 122, the radiation source 126, the thermal radiation source 134, the field camera 136, imprint field atmosphere control system, and/or the droplet inspection system 138. The processor 140 may operate based on instructions in a computer readable program stored in a non-transitory computer readable memory 142. The processor 140 may be or include one or more of a CPU, MPU, GPU, ASIC, FPGA, DSP, and a general purpose computer. The processor 140 may be a purpose built controller or may be a general purpose computing device that is adapted to be a controller. Examples of a non-transitory computer readable memory include but are not limited to RAM, ROM, CD, DVD, Blu-Ray, hard drive, networked attached storage (NAS), an intranet connected non-transitory computer readable storage device, and an internet connected non-transitory computer readable storage device.

Either the imprint head 120, the substrate positioning stage 106, or both varies a distance between the mold 110 and the substrate 102 to define a desired space (a bounded physical extent in three dimensions) that is filled with the formable material 124. For example, the imprint head 120 may apply a force to the template 108 such that mold 110 is in contact with the formable material 124. After the desired volume is filled with the formable material 124, the radiation source 126 produces actinic radiation (e.g. UV, 248 nm, 280 nm, 350 nm, 365 nm, 395 nm, 400 nm, 405 nm, 435 nm, etc.) causing formable material 124 to cure, solidify, and/or cross-link; conforming to a shape of the substrate surface 130 and the patterning surface 112, defining a patterned layer on the substrate 102. The formable material 124 is cured while the template 108 is in contact with formable material 124, forming the patterned layer on the substrate 102. Thus, the nanoimprint lithography system 100 uses an imprinting process to form the patterned layer which has recesses and protrusions which are an inverse of the pattern in the patterning surface 112. In an alternative embodiment, the nanoimprint lithography system 100 uses an imprinting process to form a planar layer with a featureless patterning surface 112.

The imprinting process may be done repeatedly in a plurality of imprint fields (also known as just fields or shots) that are spread across the substrate surface 130. Each of the imprint fields may be the same size as the mesa 110 or just the pattern area of the mesa 110. The pattern area of the mesa 110 is a region of the patterning surface 112 which is used to imprint patterns on a substrate 102 which are features of the device or are then used in subsequent processes to form features of the device. The pattern area of the mesa 110 may or may not include mass velocity variation features (fluid control features) which are used to prevent extrusions from forming on imprint field edges. In an alternative embodiment, the substrate 102 has only one imprint field which is the same size as the substrate 102 or the area of the substrate 102 which is to be patterned with the mesa 110. In an alternative embodiment, the imprint fields overlap. Some of the imprint fields may be partial imprint fields which intersect with a boundary of the substrate 102.

The patterned layer may be formed such that it has a residual layer having a residual layer thickness (RLT) that is a minimum thickness of formable material 124 between the substrate surface 130 and the patterning surface 112 in each imprint field. The patterned layer may also include one or more features such as protrusions which extend above the residual layer having a thickness. These protrusions match the recesses 114 in the mesa 110.

Template

Figure 2:
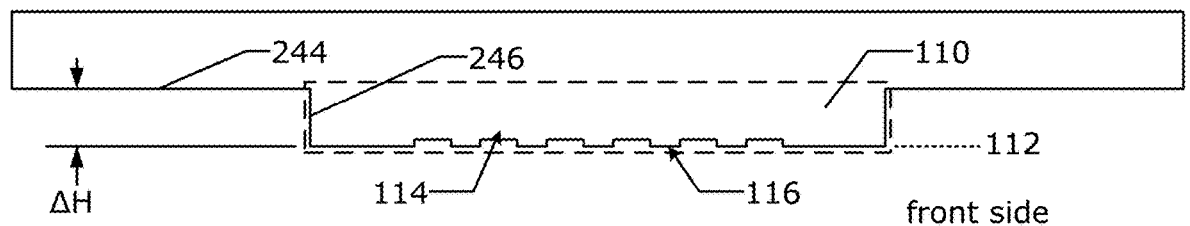
FIG. 2 is an illustration of an exemplary template that may be used in an embodiment.

FIG. 2 is an illustration of a template 108 that may be used in an embodiment. The patterning surface 112 may be on a mesa 110 (identified by the dashed box in FIG. 2). The mesa 110 is surrounded by a recessed surface 244 on the front side of the template. Mesa sidewalls 246 connect the recessed surface 244 to patterning surface 112 of the mesa 110. The mesa sidewalls 246 surround the mesa 110. In an embodiment in which the mesa is round or has rounded corners, the mesa sidewalls 246 refers to a single mesa sidewall that is a continuous wall without corners. The mesa extends a mesa height $\Delta H$ above the recessed surface 244. In an embodiment, the mesa height $\Delta H$ of the mesa is 30 µm. In an embodiment, the mesa height $\Delta H$ of the mesa is 15, 90, or 120 µm.

Imprinting Process

Figure 3:
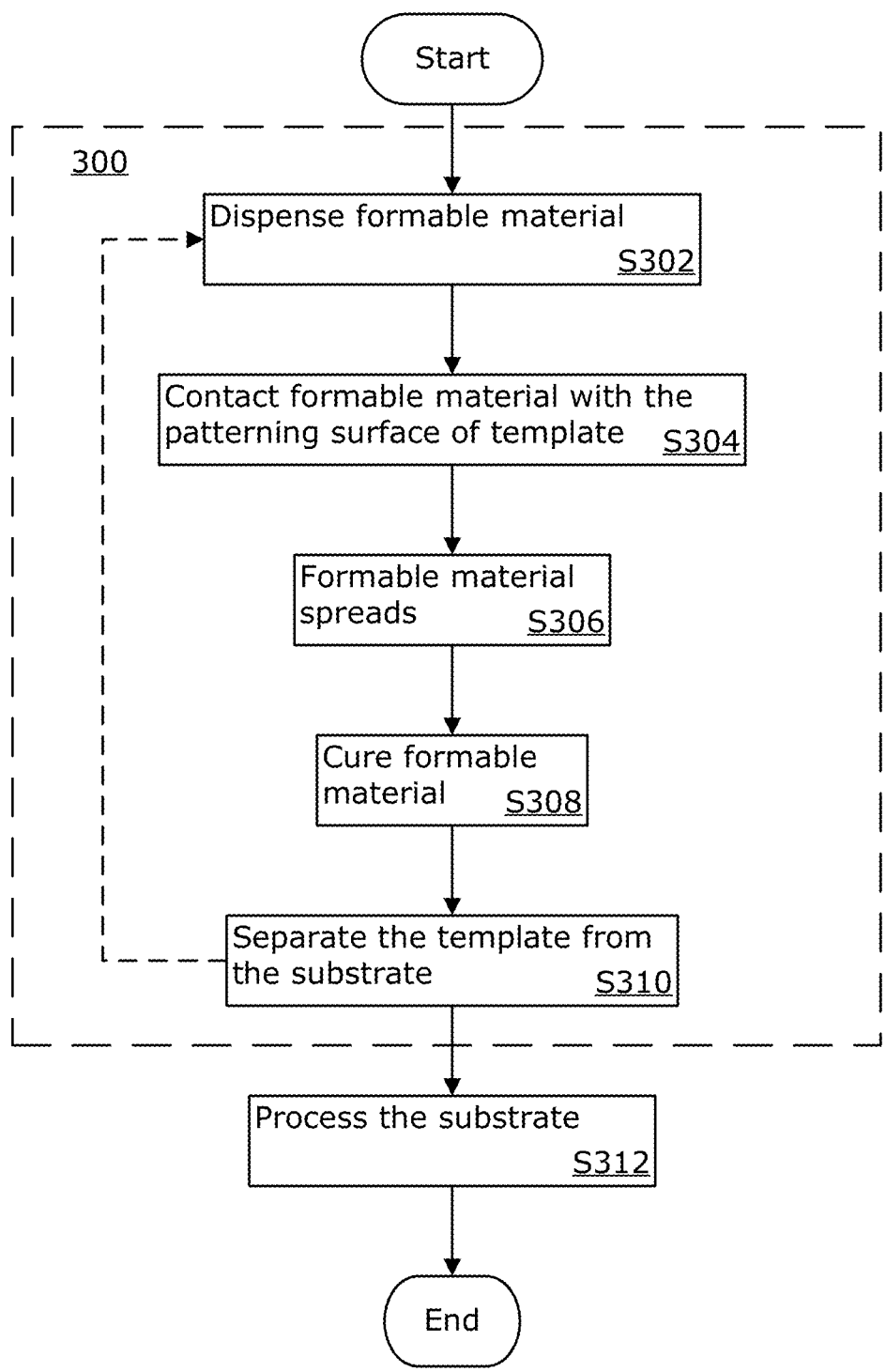
FIG. 3 is a flowchart illustrating an exemplary imprinting process as used in an embodiment.

FIG. 3 is a flowchart of a method of manufacturing an article (device) that includes an imprinting process 300 by the nanoimprint lithography system 100 that can be used to form patterns in formable material 124 on one or more imprint fields (also referred to as: pattern areas or shot areas). The imprinting process 300 may be performed repeatedly on a plurality of substrates 102 by the nanoimprint lithography system 100. The processor 140 may be used to control the imprinting process 300.

In an alternative embodiment, the imprinting process 300 is used to planarize the substrate 102. In which case, the patterning surface 112 is featureless and may also be the same size or larger than the substrate 102.

The beginning of the imprinting process 300 may include a template mounting step causing a template conveyance mechanism to mount a template 108 onto the template chuck 118. The imprinting process may also include a substrate mounting step, the processor 140 may cause a substrate conveyance mechanism to mount the substrate 102 onto the substrate chuck 104. The substrate may have one or more coatings and/or structures. The order in which the template 108 and the substrate 102 are mounted onto the nanoimprint lithography system 100 is not particularly limited, and the template 108 and the substrate 102 may be mounted sequentially or simultaneously.

In a positioning step, the processor 140 may cause one or both of the substrate positioning stage 106 and/or a dispenser positioning stage to move an imprinting field i (index i may be initially set to 1) of the substrate 102 to a fluid dispense position below the fluid dispenser 122. The substrate 102, may be divided into N imprinting fields, wherein each imprinting field is identified by an index i. In which N is a real integer such as 1, 10, 75, etc. $\{N \in \mathbb{Z}^+\}$. In a dispensing step S302, the processor 140 may cause the fluid dispenser 122 to dispense formable material onto an imprinting field i. In an embodiment, the fluid dispenser 122 dispenses the formable material 124 as a plurality of droplets. The fluid dispenser 122 may include one nozzle or multiple nozzles. The fluid dispenser 122 may eject formable material 124 from the one or more nozzles simultaneously. The imprint field i may be moved relative to the fluid dispenser 122 while the fluid dispenser is ejecting formable material 124. Thus, the time at which some of the droplets land on the substrate may vary across the imprint field i. In an embodiment, during the dispensing step S302, the formable material 124 may be dispensed onto a substrate in accordance with an imprinting drop pattern $P_I$. The imprinting drop pattern $P_I$ may include information such as one or more of position to deposit drops of formable material, the volume of the drops of formable material, type of formable material, shape parameters of the drops of formable material, etc. In an embodiment, the drop pattern may include only the volumes of the drops to be dispensed and the location of where to deposit the droplets.

After, the droplets are dispensed, then a contacting step S304 may be initiated, the processor 140 may cause one or both of the substrate positioning stage 106 and a template positioning stage to bring the patterning surface 112 of the template 108 into contact with the formable material 124 in imprint field i.

During a spreading step S306, the formable material 124 then spreads out towards the edge of the imprint field i and the mesa sidewalls 246. The edge of the imprint field may be defined by the mesa sidewalls 246. How the formable material 124 spreads and fills the mesa can be observed via the field camera 136 and may be used to track a progress of a fluid front of formable material.

In a curing step S308, the processor 140 may send instructions to the radiation source 126 to send a curing illumination pattern of actinic radiation through the template 108, the mesa 110 and the patterning surface 112. The curing illumination pattern provides enough energy to cure (polymerize) the formable material 124 under the patterning surface 112.

In a separation step S310, the processor 140 uses one or more of the substrate chuck 104, the substrate positioning stage 106, template chuck 118, and the imprint head 120 to separate the patterning surface 112 of the template 108 from the cured formable material on the substrate 102. If there are additional imprint fields to be imprinted then the process moves back to step S302.

In an embodiment, after the imprinting process S300 is finished additional semiconductor manufacturing processing is performed on the substrate 102 in a processing step S312 so as to create an article of manufacture (e.g. semiconductor device). In an embodiment, each imprint field includes a plurality of devices.

The further semiconductor manufacturing processing in processing step S312 may include etching processes to transfer a relief image into the substrate that corresponds to the pattern in the patterned layer or an inverse of that pattern. The further processing in processing step S312 may also include known steps and processes for article fabrication, including, for example, inspection, curing, baking, oxidation, layer formation, deposition, doping, planarization, etching, formable material removal, thinning, dicing, singulation, bonding, packaging, and the like. The substrate 102 may be processed to produce a plurality of articles (devices). In an embodiment, one or more of the further processing steps are performed while the substrate 102 is on the substrate chuck 104 and within the nanoimprint lithography system 100. In an embodiment, all of the processing steps are performed outside of the nanoimprint lithography system 100.

Method of Classifying Images

The imprinting process 300 as performed by the nanoimprint lithography system 100 produces an imprinted film 424 on the substrate 102. The quality of the imprinted film 424 is dependent upon a plurality imprinting parameters. A non-limiting list of exemplary imprinting parameters are: drop dispense pattern; template shape; spatio-temporal illumination pattern of actinic radiation; droplet volumes; substrate coating; template coating; template priming; template trajectory; formable material formulation; time from the template initially contacting the formable material to the formable material reaching a particular imprint field edge; time from the template initially contacting the formable material to the formable material reaching a particular imprint field corner; gas purge conditions (flow, time, and/or mixture); imprint sequence; back pressure; final imprint force: drop edge exclusion zone; spread time; gas flows and curing parameters; etc. Determining what these imprinting parameters are and making sure that the imprinting process 300 stays on track requires a method of characterizing the quality of the imprinted film. The applicant has also determined that obtaining a first estimate of these imprinting parameters may include imprinting a plurality of fields with a variety of imprinting parameters but only inspecting key regions of the imprinted film for key defects. In an embodiment, key regions include particular features such as marks, and/or imprint field edges, sets of parallel edges (from for example imprint field streets or ring around an area that is to be become an article of manufacture), and/or regions of variation. Regions of variation are regions within the imprinting field where non-fill and/or extrusion defects have a tendency to appear. Examples of regions of variation are regions in which one or more of the following changes: drop density; drop pattern; feature density on the template or substrate; feature orientation on the template or substrate; substrate topography; etc.

Figure 4A:
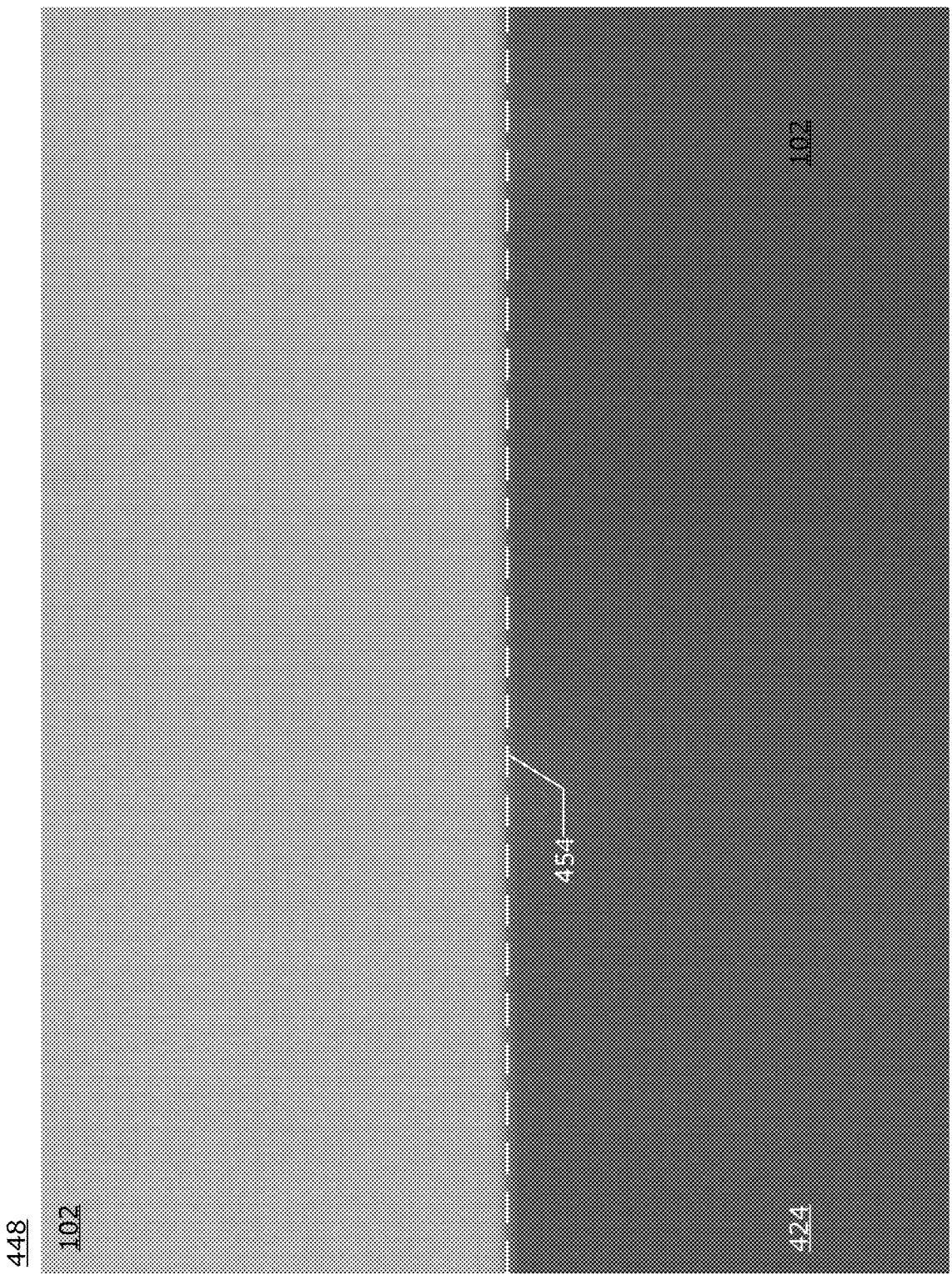
FIGS. 4A-C are micrographs of portions of imprinted films as may be used by an embodiment.
Figure 4B:
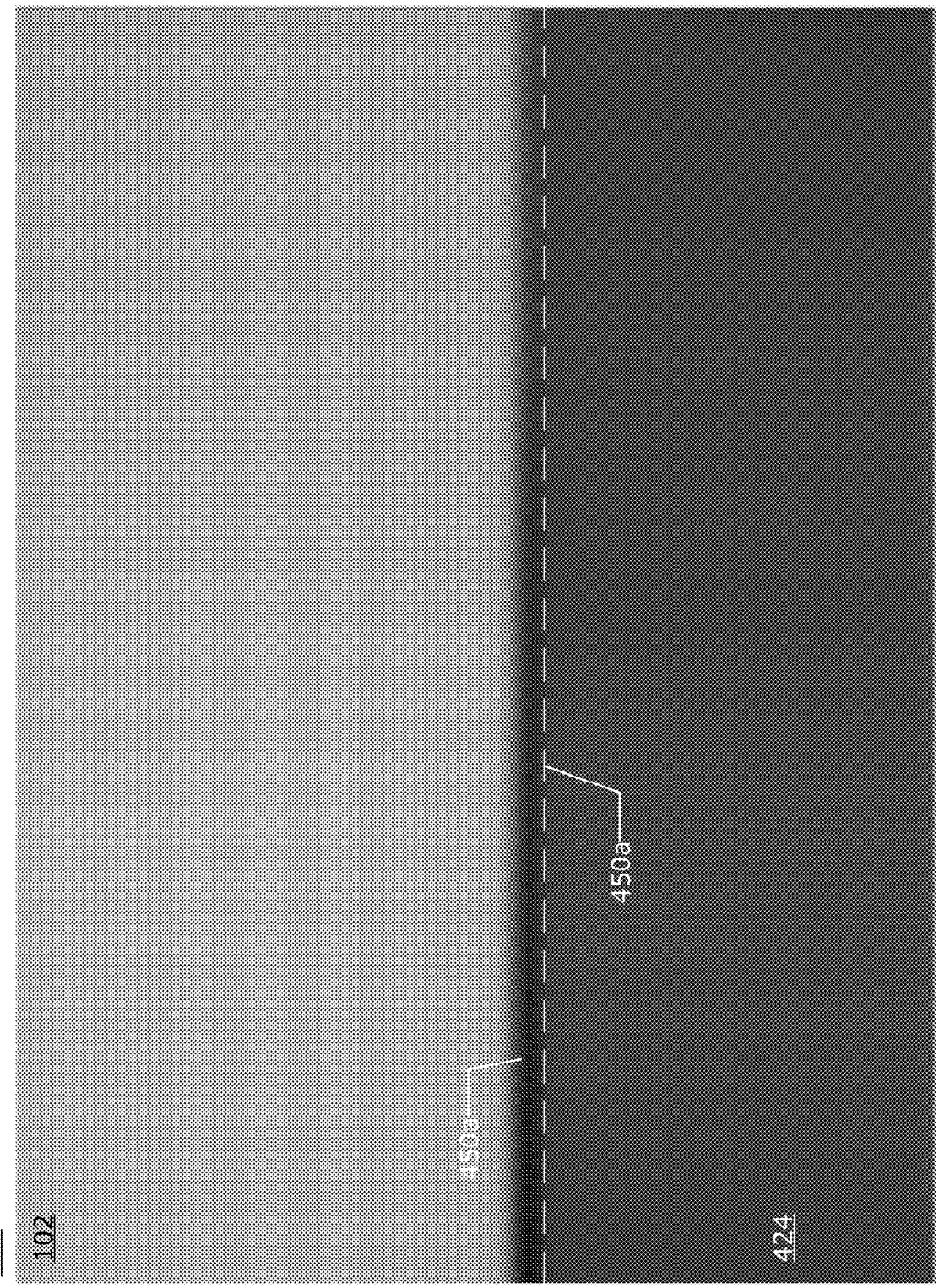
Figure 4C:
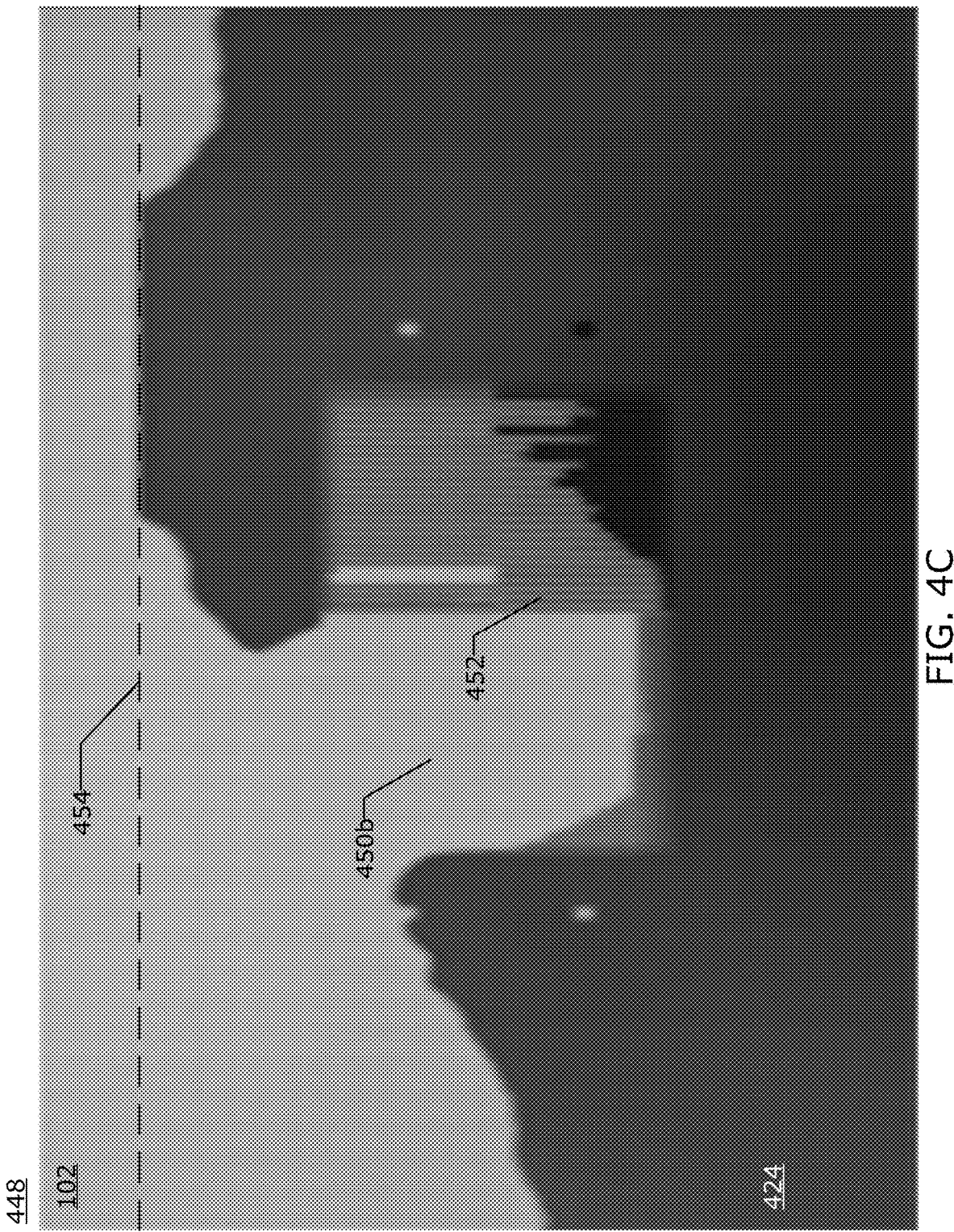

Determining the quality of the imprinted film 442 may include direct inspection methods such as inspecting all or limited portions of the imprinted film 424 on the substrate 102 with an optical microscope as illustrated in the images 448 in FIGS. 4A-C. Other indirect methods may also be used for example by inspecting the substrate 102 after the imprinted film and substrate have been etched. Other inspection tools besides microscopes may also be used such as laser scan tools or atomic force microscopy tools. One aspect of the quality of an imprinted films is the presence of defects such as an extrusion defect 450a or a non-fill defect 450b.

Previous methods of identifying extrusion defects 450a and non-fill defects 450b includes having an operator visually inspect an image 448 to determine if it contains a defect such as an extrusion defect 450a and/or a non-fill defect 450b. Optical images 450b of fields imprinted under the same process conditions, can have different intensities, regardless of the existence of a defect. This is a challenge for automatic defect detection. In some cases, the applicant has found that given a set of images imprinted under the similar process conditions and the similar imaging conditions, it can be difficult to impossible to obtain a reference image which may be used by as a standard for defect identification. The applicant has found that it is useful to be able to detect defects and identify the type of imprint defect in images, in which the imprint condition vary without having the need to compare every image to a standard reference image.

The applicant has found that there is a diversity of types of images 448 in which imprint defects 450 need to be identified. Examples of the types of images in which imprint defects 450 need to be identified are: images 448 that contain an imprint field edge 454 as illustrated in FIGS. 4A-B; images 448 that contain a mark 452 near the imprint field edge 454 as illustrated in FIG. 4C; and images that contain a mark that crosses the imprint field edge 454 into a street between two imprint fields edges. The present disclosure describes a method of robustly identifying artifacts in images 448, in order to distinguish them from defects 450.

The applicant has found that the image classification method 500 described in FIGS. 5A-E is able to detect defects 450 in images 448 of portions of the imprinted film 424. The image classification method 500 may include a receiving step S502 in which the processor 140 receives an image 448. During the receiving step S502 the processor 140 may also receive information about the image 448. Examples of information may include a type of feature in the image 448. Examples of the type of feature include: a straight edge, a curved edge, a corner, and a mark. The processor 140 may also receive information identifying one or more of: a region of interest T in the image 448, an orientation of the feature in the image 448, a portion of the image 448 in which a region of interest may be located, a plurality of features and corresponding regions of interest, relative position of the portion of the imprinted film 424 on the substrate 102, imprint field location, location in the imprint field, etc.

The image classification method 500 may use image processing and regression analysis to identify relatively large extrusion defects 450*a* (see FIG. 4B and large non-fill defects 450*b* (see FIG. 4C). The image classification method 500 may include a selecting step S504 of selecting a computer vision parameter $C_P$ for an image feature identification process $P_F$. The computer vision parameter $C_P$ is selected such that the image feature identification process $P_F$ identifies at least one feature in the image when using the computer vision parameter $C_P$. The image feature identification process $P_F$ is any of one or more computer vision processes for identifying edges in an image such as those implemented in the Python computer vision library such as Canny edge detector, Hough transform, etc. One or more of the methods implemented in the Python computer vision library may be combined together to create the image identification process $P_F$. One or more of the methods that are combined to create the image identification process $P_F$. The computer vision parameter $C_P$ includes one or more of the parameters that are used by the image identification process $P_F$ the result of which meets a criteria. A non-limiting list of Python computer vision libraries are (OpenCV; SciPy; Pillow; Scikit-image; etc.) any of which may be used in the image classification method 500. Other languages such as C, C++, Java, MATLAB®, R, etc. and their corresponding computer vision libraries may also be used instead of and/or in addition to python in the image classification method 500.

Figure 5A:
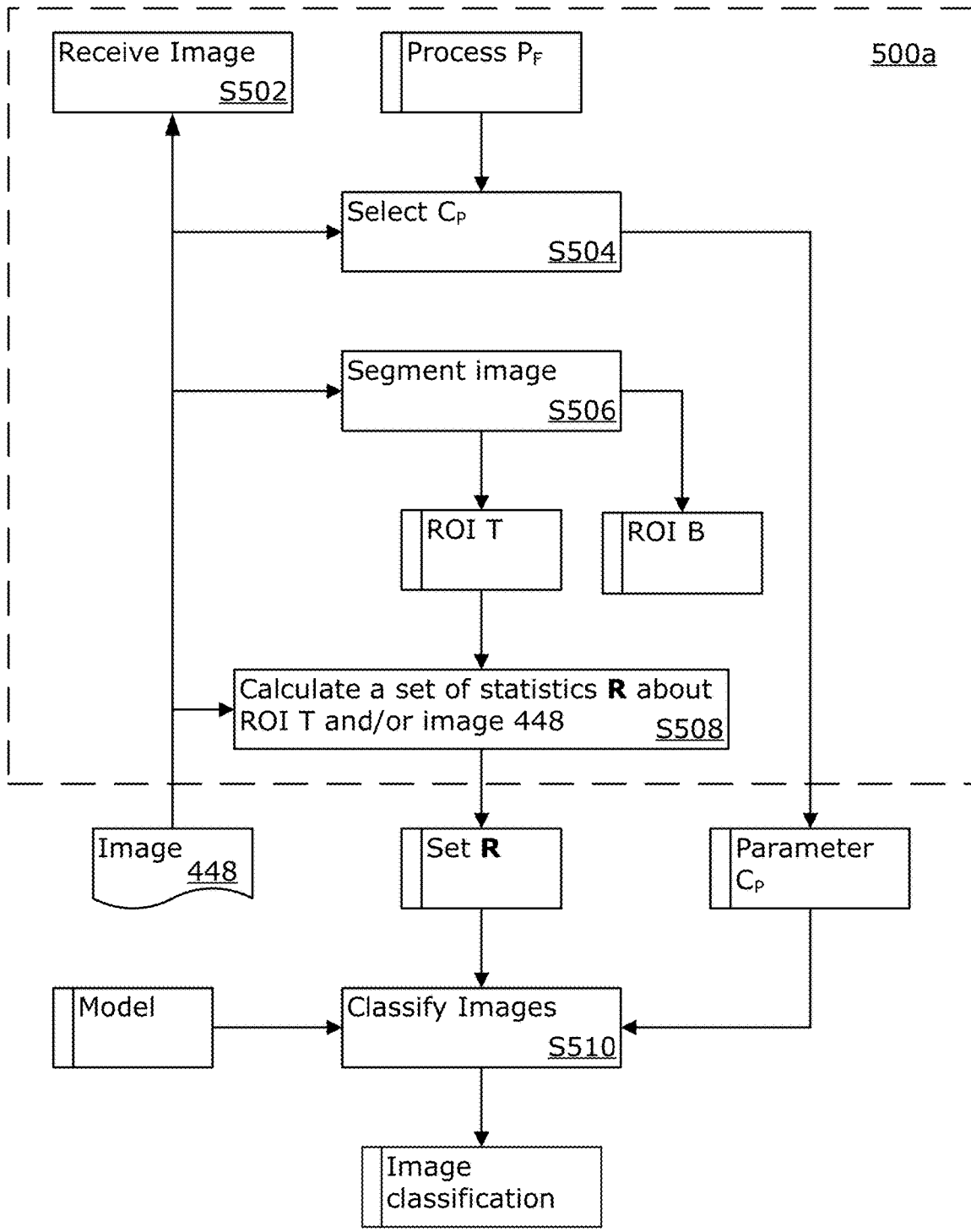
FIGS. 5A-E are flowcharts illustrating exemplary processes used in an embodiment.
Figure 5B:
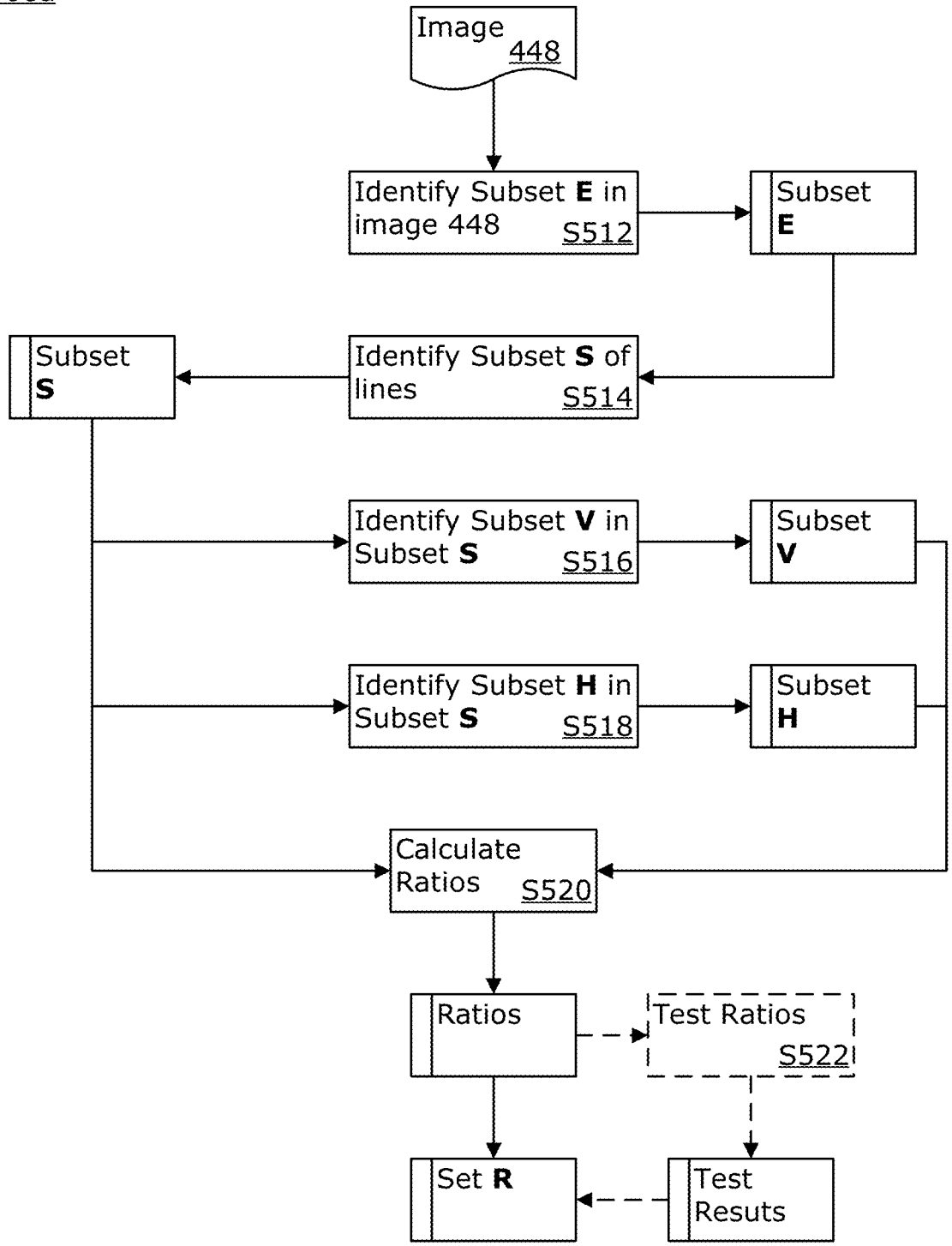

The image classification method 500, as illustrated in FIG. 5A, may include a segmenting step S506 in which the image 448 is segmented into a region of interest T and a background region B. The image classification method 500 may include a calculation step S508 in which a set R of statistical values is calculated about the region of interest T of the image 448 and/or alternatively about the image 448. In an alternative embodiment, the calculation step S508 also includes a subprocess S508*a*, as illustrated in FIG. 5B, in which additional statistical values are calculated about the image 448 and added to the set R. In an alternative embodiment, the segmenting step S506 is skipped and the set R of statistical values are calculated about the image 448 as a whole in the calculation step S508. Image preprocessing subprocess 500*a* includes steps S502-S508 and computes the computer vision parameter $C_P$ and the set R of statistical values based on receiving the image 448.

The image classification method 500 may include a classification step S510, as illustrated in FIG. 5A, in which the image 448 is classified based on both the computer vision parameter $C_P$ and the set R of statistical values. A result of the image classification step S510 is an image classification such as one selected from the group of: a defect containing image and a defect free image. The classification step S510 may be a machine learning process such as those implemented in the Python machine learning library. A non-limiting list of libraries that implement the Random Forest method are: tensorflow.contrib.tensor_forest; sklearn.ensemble; etc. Other languages such as MATLAB®, R, etc. and their corresponding machine learning libraries may also be used instead of and/or in addition to python in the classification step S510.

The classification step S510 may be a supervised learning process. In supervised learning the classification is performed by building models (learning or training phase) based on labeled data and inferring classes (prediction) for unseen data using the created model. One example of supervised learning approach is a decision tree. A decision tree is a flowchart-like structure in which each internal node represents a "test" on an attribute (attributes are set of statistics and computer vision parameters $C_P$–columns of set R), each branch represents the outcome of the test (non-fill, extrusion or no defect, and each leaf node represents a class label for each row of set R. The applicant has found that when decision trees are used to analyze images 448 of an imprinted film 424 they tend to have low errors rate during training and high error rate during prediction. To overcome this overfitting problem, the applicant has determined that it is possible to predict the presence, or not, of defects in images 448 of an imprinted film 424 by implementing a Random Forest Supervised Learning process. Random Forests are a popular ensemble method that can be used to build for classification problems. Random Forest consists of many individual decision tress that operates as and assemble. In our approach we utilize this algorithm to find non-fill, extrusion, and no defects categories by analyzing the set of statistics R related to a set of images 448. Each individual tree is built by randomly selecting some rows and columns from data set R. The image classification method 500 outputs an image classification for each image 448. In an embodiment, the image classification is a label in which each image is classified as one of: an image containing an extrusion defect; an image containing a non-fill defect; an image containing both extrusion and non-fill defects; a defect free image.

Method of Calculating Some Statistical Values

FIG. 5B illustrates an exemplary subprocess S508*a* of calculating some statistical values for the set R of statistical values using the image 448. The subprocess S508*a* may include an edge identification step S512 that identifies a subset E of pixels in the image 448 which are likely to represent an edge in the imprinted film 424. In an embodiment, the edge identification step S512 uses one or more of the numerous methods separately or in combination to identifying edges in images such as those implemented in the image processing library, as described above. The presence of a large non-fill defect may be found by using one or more edge detection methods separately or in combination to identify edges in a cropped image 448 of the imprinted film 424. Exemplary methods of edge detection methods which may be used in the edge identification step S512 includes: Canny edge detection and its numerous variations; ridge detection; and various other methods that are well known in the art. The results of these edge detection methods is the subset E of the pixels in the image 448 in which there is a high likelihood that an edge exists.

The subprocess S508*a* may include an edge identification step S514 that one or more edge detection methods for identifying edges in the subset E of pixels. In the context of the present disclosure a edge includes both straight edges and curved edges. The edge identification step S514 may include applying one or more transformations to the subset E to identify one or more edges in the image forming a subset S of individual edges in the image 448 that are likely to be edges in the image 448. The transform used in the edge identification step S514 may be a Hough transform or other such methods for identifying one or more edges in an image.

The subprocess S508*a* may include a vertical edge detection step S516 in which a subset V of the subset S has an x-coordinate close to each other. The subprocess S508a may include a horizontal edge detection step S518 in which a subset H of the subset S may be identified that has a y-coordinate close to each other. The subprocess S508a may include a ratio calculation step S520 in which ratios $R_V$ and $R_H$ of the number of edges in the subsets V, H, S for example as described in equations (1) below. The ratios $R_V$ and $R_H$ may be added to the set R of statistical values which are then used in classification step S510.

$$R_V = \frac{|V|}{|S|} \quad (1)$$

$$R_H = \frac{|H|}{|S|}$$

Method of Selecting a Computer Vision Parameter for the Image

Figure 5C:
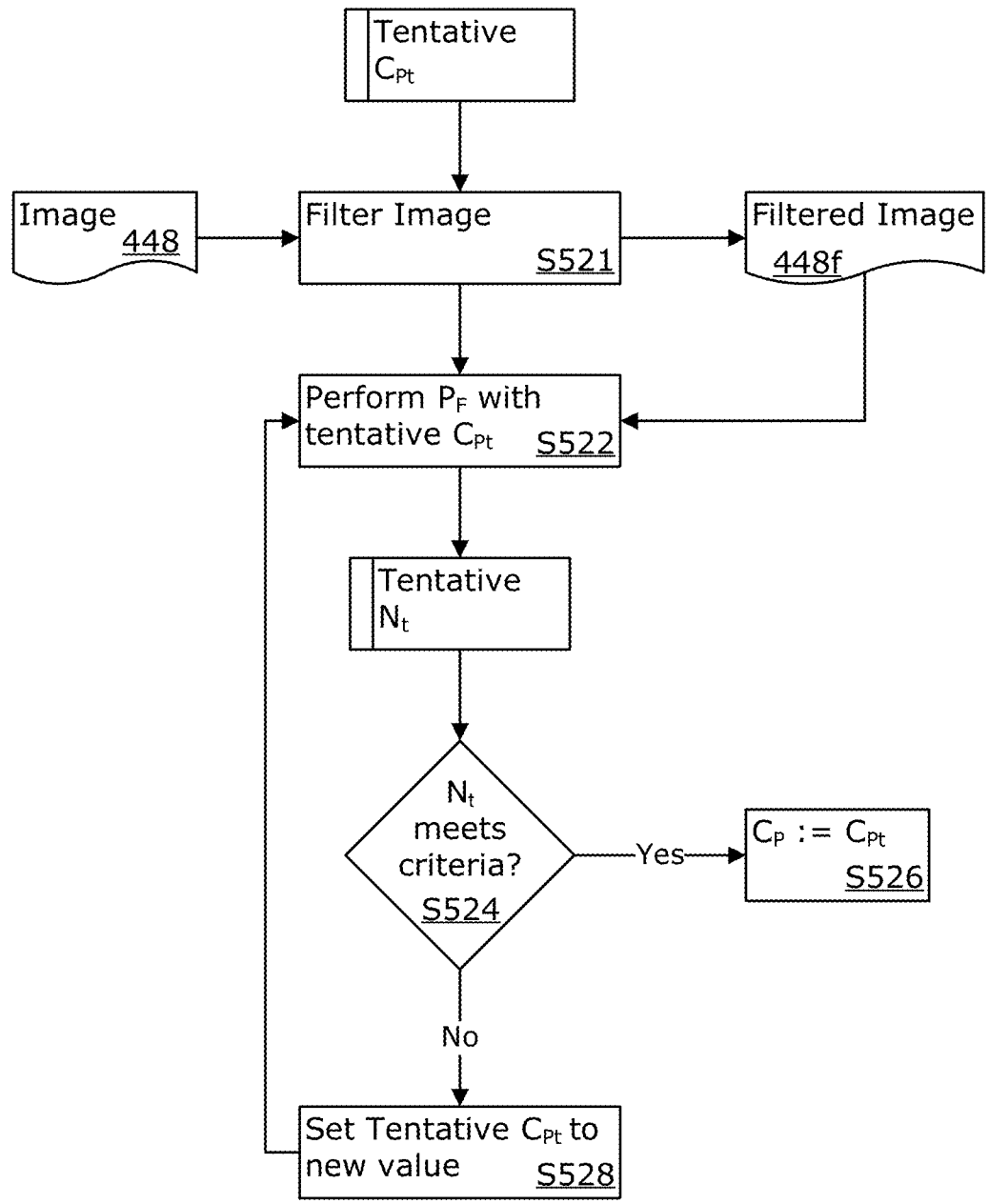

FIG. 5C is an illustration of a method of implementing the selecting step S504. The selecting step S504 may include a filtering substep S521 of in which the image 448 is filtering using one or more computer vision processes such as the applying a Sobel transformation to the image 448 and performing bilateral filtering on the transformed image to form a filtered image 448f. The selecting step S504 may include a substep S522 of performing the image feature identification process $P_F$ on the image 448 with a tentative computer vision parameter $C_{Pt}$ to identify a tentative number $N_t$ of contours in the image 448. The selecting step S504 may include a substep S524 of testing tentative number $N_t$ of connected features against a number of features criteria. In an embodiment, the criterion is that the number of features is that the tentative number $N_t$ of connected features is one. In an alternative embodiment, the criteria also specifies that the image feature identification process $P_F$ on the image 448 with a neighboring computer vision parameter $C_{PN}$ identifies zero connected features in the image 448. In which a difference between the parameters ($|C_{PT}-C_{PN}|$) is a set value such as (10, 1, 0.1, 0.001, etc.).

The selecting step S504 may include an assignment step S526 which is performed in a first case in which the tentative number $N_t$ meets the criteria. The assignment step S526 may include defining the computer vision parameter $C_P$ as having the value of tentative computer vision parameter $C_{Pt}$ ($C_P$:=$C_{Pt}$). The selecting step S504 may include a new value step S528 which is performed in a second case in which the tentative number $N_t$ does not meet the criteria. The new value step S528 may include assigning a new value to tentative computer vision parameter $C_{Pt}$ and performing the returning the process back to step S522 and the process repeats until tentative number $N_t$ meets the criteria. The selecting step S528 may use any of a number of search methods to find the computer vision parameter $C_{Pt}$ as long as the search method is consistently applied. An exemplary search method is binary search method for sorted 1D arrays as implemented in numerous standard libraries. In an embodiment, the computer vision parameter $C_P$ for each image 448 is a set of values.

In an embodiment, the image feature identification process $P_F$ includes as one of it steps using a Canny edge detection process and computer vision parameter $C_P$ is a Canny threshold used in the Canny edge detection process. Pseudocode showing one method of implementing selecting step S504 is shown below:

```
res = False; // sets default value of no error signal to false
C_t:= initValue; // initial value of tentative integer Canny threshold (i.e. 3)
WHILE (C_t < 500)
    Binary_Image = Find_Canny(Filtered_Image, C_t);
    // Find_Canny is a function that creates a binary image that is
representative of edges in Filtered_image_448f using tentative integer
Canny threshold
    N_c = findContour(Binary_Image*Filtered_Image);
    // findContour is a function that returns the number of contours (N_c)
in an image
    IF N_c = 0
        res = True; // sets no error signal to true
        ENDWHILE;
    ENDIF;
    C_t = C_t * 2;
    CONTINUEWHILE;
IF (res = True)
    res = False;
    FOR C_t to 1; // for loop decrements tentative canny threshold by 1
        Binary_Image = Find_Canny(Filtered_Image, C_t);
        N_c = findContour(Binary_Image*Filtered_Image);
        IF(N_c > 0)
            res = True; // sets no error signal to true
            ENDFOR;
        ENDIF;
        CONTINUEFOR;
ENDIF;
IF (res = True)
    RETURN C_t; // subroutine ends and returns tentative computer
vision parameter as computer vision parameter C_P
ELSE
    RETURN False; // returns error signal
ENDELSE;
```

Method of Selecting a Region of Interest in an Image

Figure 5D:
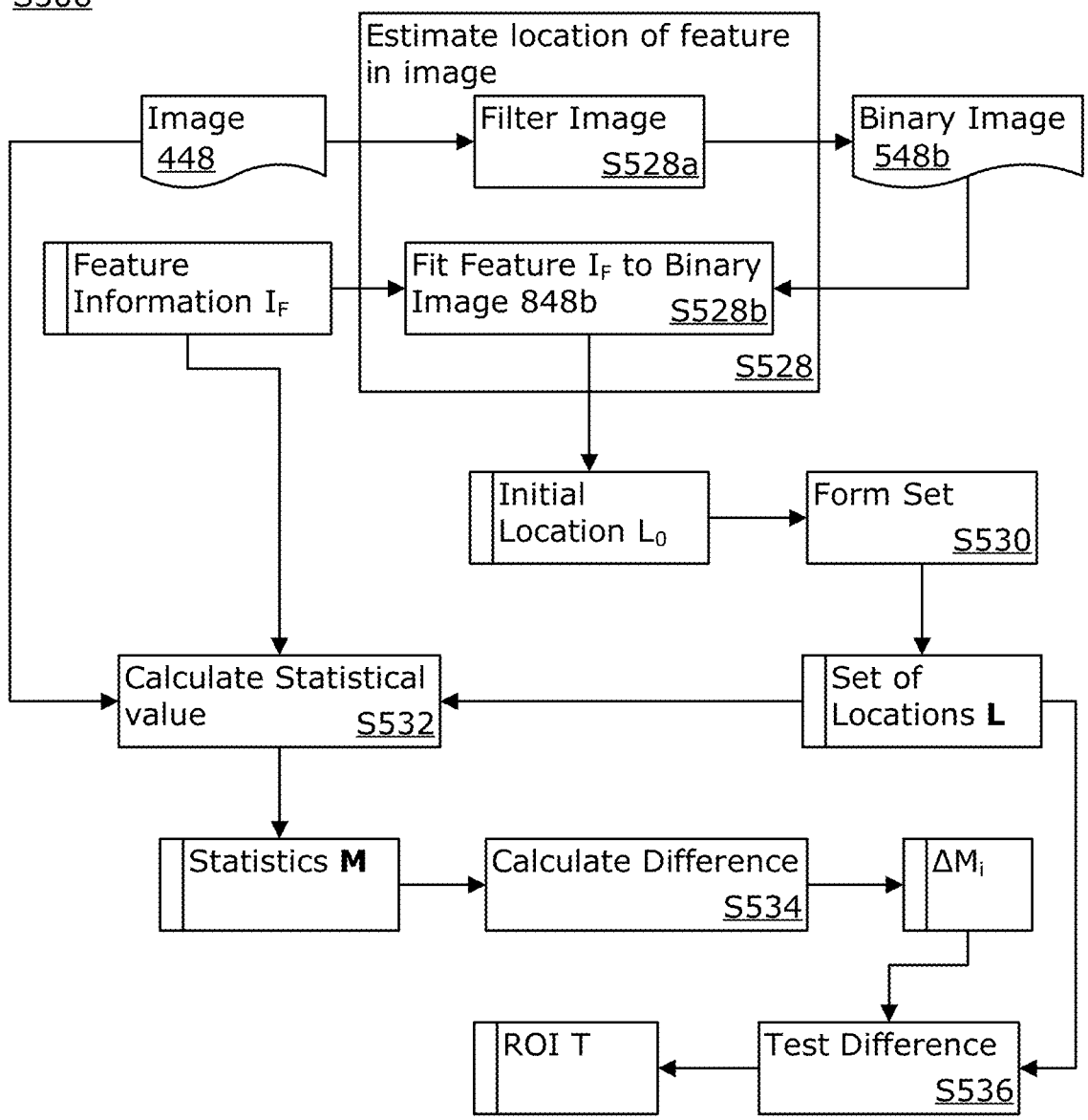
Figure 5E:
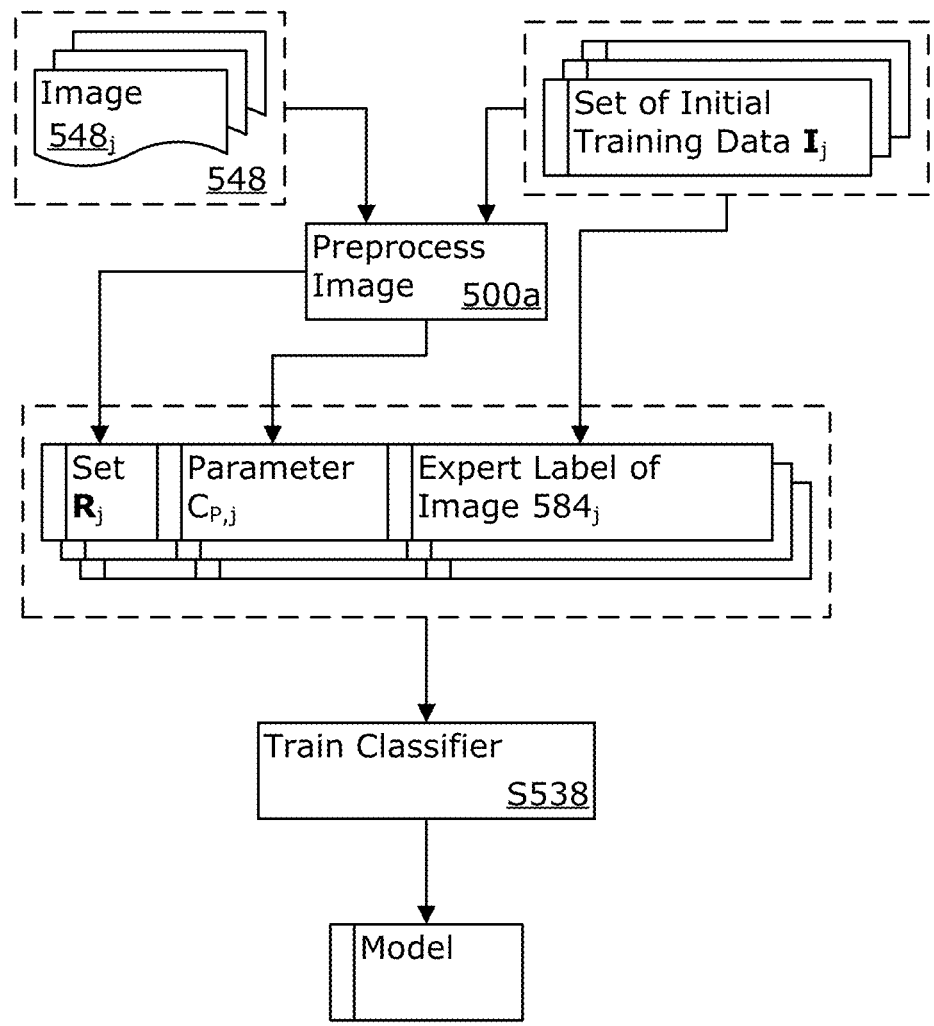

FIG. 5D is an illustration of a method of implementing the segmenting step S506 of segmenting the image 448 into a region of interest (ROI) T and a background region B. The ROI T of the image includes a feature such as: a straight edge; a curved edge; a mark; and/or some combination of these features. Each image 448 may include multiple ROI T each which may be treated separately in this process. Defect detection may then be performed within the ROI T of the image 448. In an embodiment, the substrate 102 has a plurality of imprinted films 424, each of the imprinted films 424 is surrounded by an imprint field edge 454, and streets on the substrate 102 separate the imprinted films 424 from each other. In an embodiment, the segmenting step S506 may determine for each imprint field edge 454 the ROI T between the street and an interior portion of the imprinted film 424. The segmenting step S506, may also determine a stable area (background region B) of the imprinted film 424 set some distance from the imprint field edge 454. The applicant has found that within the ROI T, intensity values of the image vary rapidly; and within the background region B intensity values of the image stay mostly the same. In an embodiment, the stable area is only determined for edges (straight or curved), or sets of parallel edges.

In an embodiment, the segmenting step S506 may take into account feature information $I_F$ that is provided to the processor 140 which identifies a type of feature that is in the image 448. The type of feature that may be in the image 448 includes but is not limited to: a mark 452; a straight edge (associated with an imprint field edge 454); or a curved edge (associated with an imprint field edge 454). The feature information $I_F$ may include: search region for the feature; a parameterized or functionalized description of the feature (linear function, sigmoid function, step wise function, a piece wise continuous function, etc.); an approximate size of the feature; an orientation of the feature. In an embodiment, the feature information $I_F$ identifies a plurality of features in the image 448 each which is handled sequentially by the image classification method 500. In an embodiment, the processor 140 calculates the feature information $I_F$ based on one or more images 448 or based on information about the substrate 102 and the template 108 and a location of the image on the substrate 102. In an alternative embodiment, the processor 140 calculates the feature information $I_F$ based on information about the substrate 102, the template 108, location of the image 448, and/or orientation of the image 448.

The segmenting step S506 may include an estimating step S528 in which an initial location $L_0$ of a feature in the image 448 is estimated. Estimating step S528 may include a filtering substep S528a of filtering the image 448 to form a binary image 548b using any of one or more filtering methods which are well known in the art some of which are implemented in the OpenCV library. The estimating step S528 may also include a fitting step S528b of fitting a parameterized edge that is based on the feature information $I_F$ to a set of points identified in the binary image 548b using for example any of a plurality of curve fitting techniques such as those implemented in a Python optimization library. A non-limiting list of curve fitting libraries are: SciPy.Optimize; Numpy; Imfit; etc. Other languages such as C, C++, C #, R, etc. and their corresponding curve fitting libraries may also be used instead of and/or in addition to python in the fitting step S528b. The results of the fitting step S528b is an initial location $L_0$ that is an initial estimate of the location of the feature described by the feature information $I_F$ in the image 448. In an embodiment, the initial location $L_0$ may include one or more of: a horizontal position; a vertical position; the parameters of the feature information $I_F$ that fitting step S528b identified as best fitting the binary image 548b.

The segmenting step S506 may include a forming substep S530 of forming a set of locations L including the initial location $L_0$ locations $L_i$ that are adjacent to and nearby location $L_0$. The set of locations L may include 3-30 individual adjacent locations. The segmenting step S506 may include a statistical value calculating step S532 in which a statistical value $M_i$ that is representative of the pixels in the image 448 that are associated with the feature described by the feature information $I_F$ that is at location $L_i$ forming a set of statistical values M associated with the set of locations L. In an embodiment, the statistical value is a median.

The segmenting step S506 may include a difference calculating step S534 in which a difference value $\Delta M_i$ between for each statistical value in the set of statistical values M. In an embodiment, the difference value $\Delta M_i$ may be defined as the difference in statistical values between neighboring locations $L_i$, for example, $(\Delta M_i = M_i - M_{i-1})$ although other methods of measuring variation may be used.

The segmenting step S506 may include a testing step S536 in which the difference value $\Delta M_i$ for each location $L_i$ is tested against a criteria and if the difference value $\Delta M_i$ meets the criteria. Pixels in the image 448 associated with the feature (for example, an imprint field edge, a set parallel edges, a mark, etc.) described by the feature information $I_F$ at the location $L_i$ in which $\Delta M_i$ meets the criteria are considered to be in the ROI T.

Figure 6A:
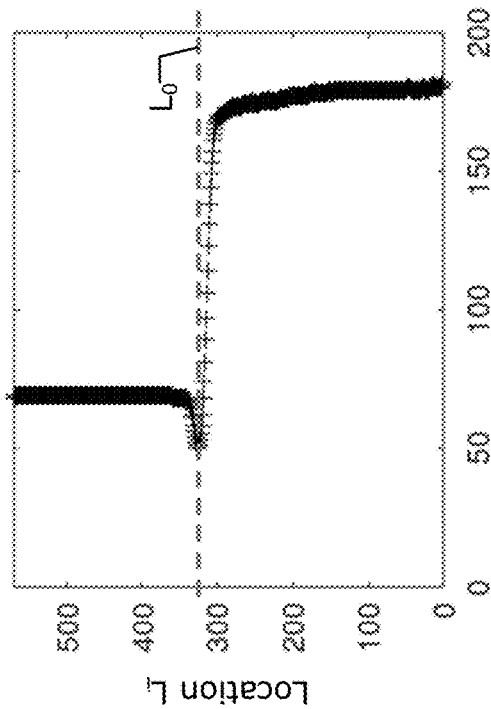
FIGS. 6A-E are images and charts illustrating information that may be used and generated by an exemplary embodiment.
Figure 6C:
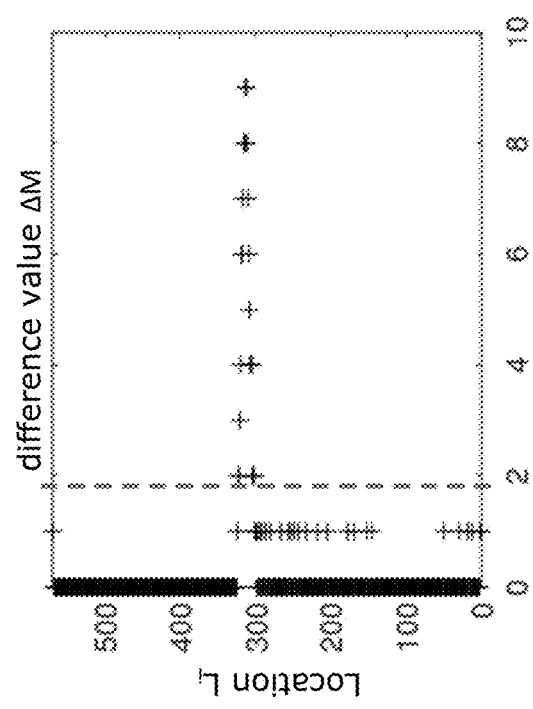
Figure 6B:
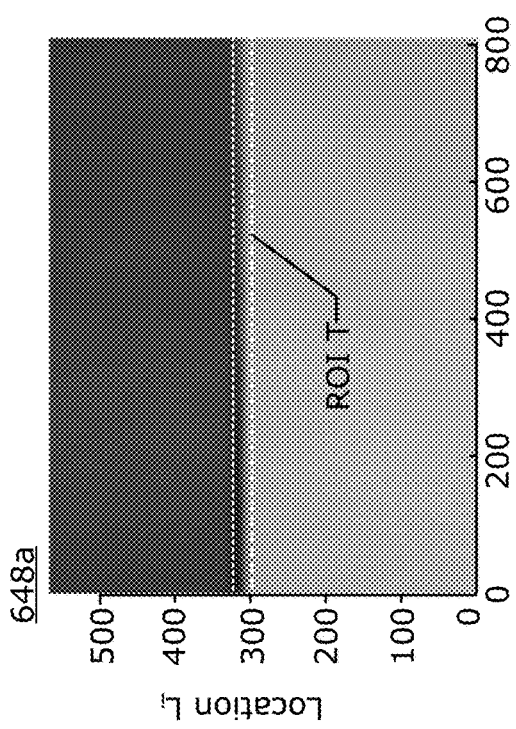

For example, consider an image 648a shown in FIG. 6A, the segmenting step S506 may filter the image 648a in the filtering substep S528a forming the binary image 648b also illustrated in FIG. 6B. In the case of image 648a, the fitting step S528b may receive feature information $I_F$ indicating that the image 648a is expected to contain a straight horizontal edge. The feature information $I_F$ may also include information that identifies the expected position and/or size of the horizontal edge. The fitting step S528b may output an initial location $L_0$ such as a y position of the horizontal edge indicated by the grey edge superimposed on top of binary image 648b in FIG. 6B. In an embodiment, the fitting step S528b may output multiple parameters such as: x position; y position; angle; width; height; the parameters of the feature information $I_F$ that define a curved edge; etc. In an alternative embodiment, the fitting step S528b may receive feature information $I_F$ indicating that the image 648a is expected to contain a straight edge that has an expected angle relative to the horizontal or vertical.

Once the initial location $L_0$ is identified, the statistical value calculating step S532 may calculate a statistical value in a limited region around the initial location based on the feature information. For example, for image 648b, since a horizontal edge has been identified as the expected feature (i.e. feature of interest), a statistical value of pixel intensities along horizontal edges in the image 648a are calculated in the region around the initial location $L_0$. FIG. 6C is an illustration of the statistical value (median) of horizontal edges for the entire image 648a instead of just the region around the initial location $L_0$ and is done for informative purposes only.

Figure 6D:
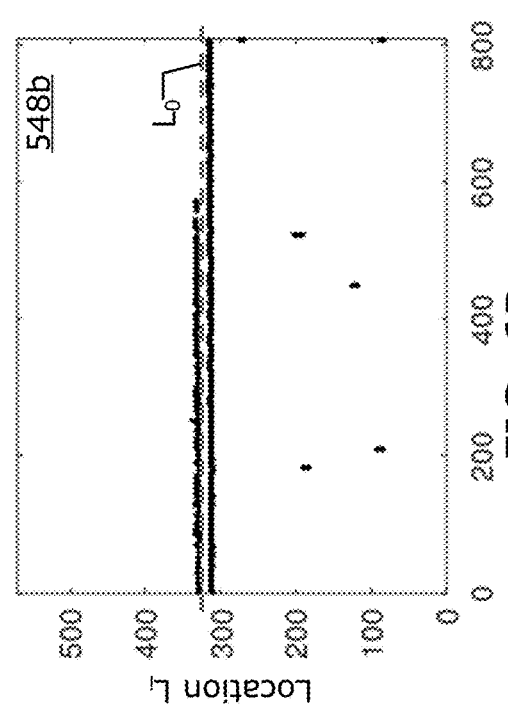

In an embodiment, after each statistical value $M_i$ is calculated in step S532 a difference value $\Delta M_i$ is also calculated in a difference calculating step S534. In an embodiment, a set of difference values is calculated for a set of statistical values. FIG. 6D is an illustration of the difference value $\Delta M_i$ for the entire image 648a instead of just the region around the initial location $L_0$ and is done for informative purposes only.

Figure 6E:
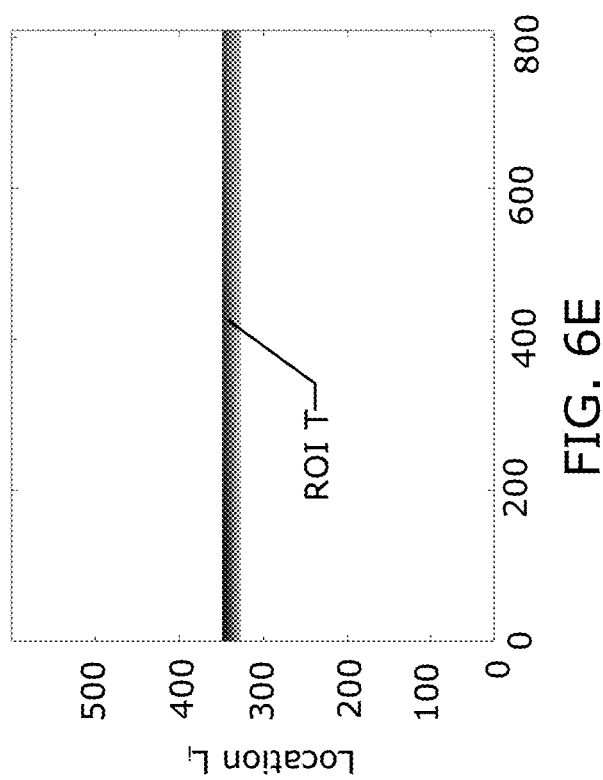
Figure 7:
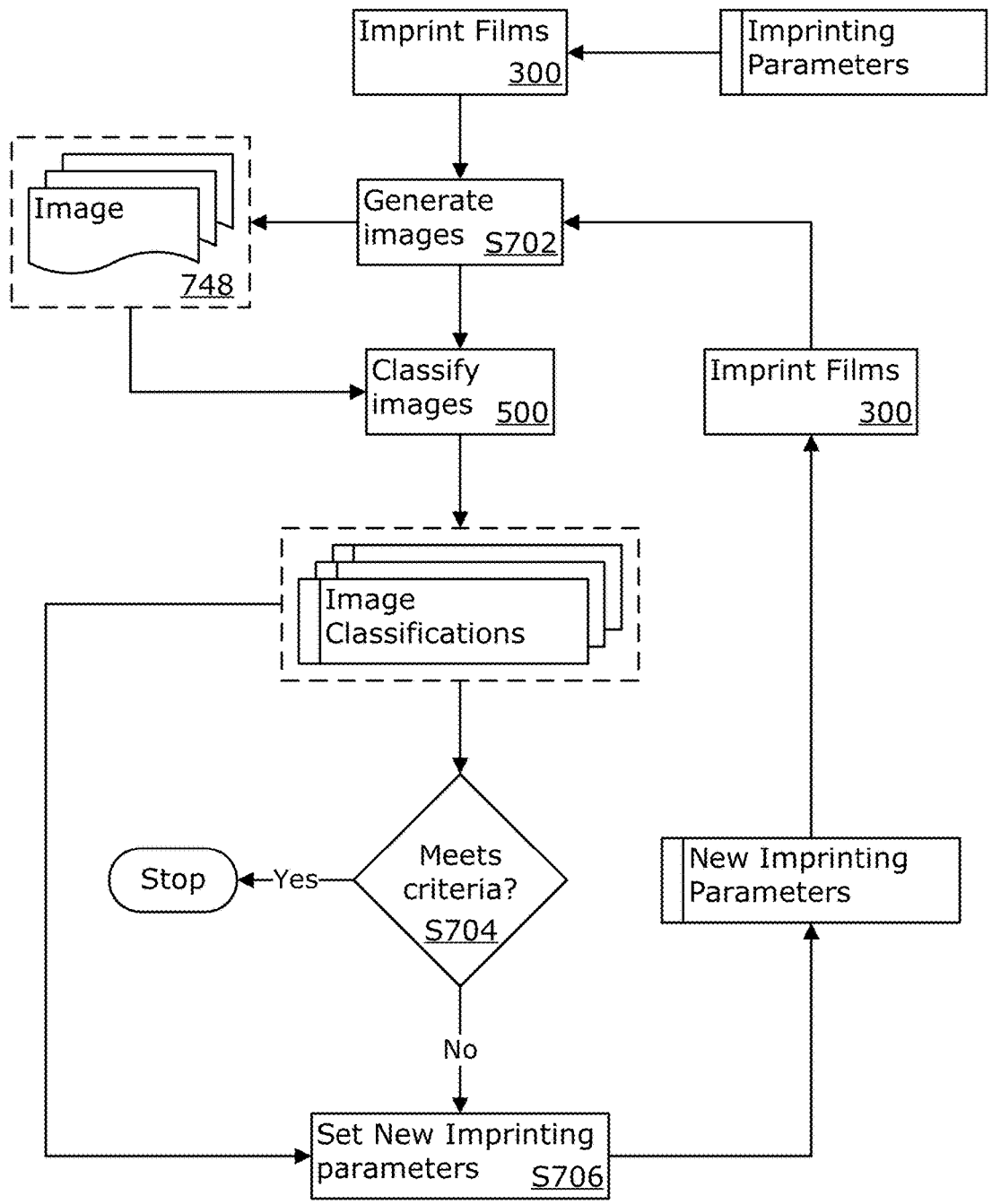
FIG. 7 is a flowchart illustrating steps that may be used in an embodiment.

In an embodiment, after each difference value $\Delta M_i$ is calculated each difference value is tested against a criteria for example if the difference value $\Delta M_i$ above a threshold such as the threshold illustrated by the gray dashed edge in FIG. 6D. In an embodiment, criteria may be more complicated such as the absolute value of the difference value $\Delta M_i$ is greater than a threshold. In an embodiment, once the difference value $\Delta M_i$ does not meet the criteria, then neighboring statistical values and/or neighboring difference values are not calculated and/or tested. In an embodiment, an output of the testing step S536 is a ROI T, an example of which is illustrated in FIG. 6A, in which the portion of the image 648a that overlaps with identified features in which the difference values meet the criteria as determined by the testing step S536. In an embodiment, the ROI T is a continuous portion of the image 648a and only one continuous region is identified for each identified feature. FIG. 6E is an illustration of just ROI T identified by the testing step S536.

In an embodiment, the feature information $I_F$ indicates that the feature is an edge, for horizontal (or vertical) detected edges identified by step S528, traverse several pixels up and down (or left and right in case of vertical edge). For each of this row (or column) calculate median (statistical value $M_i$) of pixel intensity for this row (or column) as in statistical value calculating step S532. If the calculated median of pixel intensity profile stays the same as determined in the testing step S536, these rows (columns) corresponds to stable regions (ROI B); otherwise, these rows (columns) corresponds to transition regions (ROI T). For horizontal (or vertical) edges within the transition area (ROI T), calculating the set R of statistical values in a calculating step S508, examples of statistical values that may be calculated are shown in equations (3a-d) below:

$$R_1 = \max_{across\ i} \left( \max_{feature\ at\ location\ i} (ROIT) - \median_{feature\ at\ location\ i} (ROIT) \right) \quad (3a)$$

$$R_2 = \max_{across\ i} \left( \median_{feature\ at\ location\ i} (ROIT) - \min_{feature\ at\ location\ i} (ROIT) \right) \quad (3b)$$

$$R_3 = \min_{across\ i} \left( \median_{feature\ at\ location\ i} (ROIT) \right) \quad (3c)$$

$$R_4 = \max_{across\ i} \left( \median_{feature\ at\ location\ i} (ROIT) \right) \quad (3d)$$

In the present disclosure, $\max_{feature\ at\ location\ i}$(ROI T) refers to the maximum pixel value in the image 448 among the pixels that correspond to the feature specified by feature information $I_F$ at location $L_i$ in the ROI T. In the present disclosure, $\min_{feature\ at\ location\ i}$(ROI T) refers to the minimum pixel value in the image 448 among the pixels that correspond to the feature specified by feature information $I_F$ at location $L_i$ in the ROI T. In the present disclosure, $\median_{feature\ at\ location\ i}$(ROI T) refers to the median pixel value in the image 448 among the pixels that correspond to the feature specified by feature information $I_F$ at location $L_i$ in the ROI T. In the present disclosure, $\max_{across\ i}(\ )$ refers to the maximum value across the index i. In the context of calculating the set of statistical values that is only the index i that corresponds to the ROI T identified in the segmenting step S506.

In an embodiment, the set R of statistical values includes values that are calculated are over a set of multiple images which are similar in some manner. The images may be similar, in terms of one or more of: being on the same location on a substrate across multiple substrate which were processed under similar conditions, being in the same location on an imprinted fields across multiple fields on a substrate; the imprinted film was processed under similar conditions and the image contains similar features as identified by feature information $I_F$. For example, for a group of images representative of the same location on an imprinted film 424 at the same location the following thresholds described in equations 3e-h may be used:

$$R_5 = \median_{across\ multiple\ images} \left( \max_{entire\ ROIT} (ROIT) - \median_{entire\ ROIT} (ROIT) \right) \quad (3e)$$

$$R_6 = \median_{across\ multiple\ images} \left( \median_{entire\ ROIT} (ROIT) - \min_{entire\ ROIT} (ROIT) \right) \quad (3f)$$

$$R_7 = \median_{across\ multiple\ images} (R_3) \quad (3g)$$

$$R_8 = \median_{across\ multiple\ images} (R_4) \quad (3h)$$

In the present disclosure, $\median_{across\ multiple\ images}(\ )$ refers to the calculation of a median value across multiple similar images. In which the images are similar in the manner discussed above. In the present disclosure, $\max_{entire\ ROI\ T}$(ROI T) refers to the maximum pixel value in the image 448 among the pixels in the ROI T. In the present disclosure, $\median_{entire\ ROI\ T}$(ROI T) refers to the median pixel value in the image 448 among the pixels in the ROI T. In the present disclosure, $\min_{entire\ ROI\ T}$(ROI T) refers to the minimum pixel value in the image 448 among the pixels in the ROI T.

In an embodiment, the statistical values described above are calculated for one type of feature such as: straight edges; curved edges; sets of parallel edges; etc. While a different set of statistical values are calculated for the ROI T that contain other type of feature such as alignment marks or other types of features with complicated line-spacing patterns. In an embodiment, a ROI T that includes the other type of feature is identified. Several statistical values about that ROI T are then calculated about the intensities of the pixels in the ROI T and placed in the set R of statistical values. Examples of such statistical values are: higher order statistics (such as standard deviation, skewness, kurtosis, etc.) and n-th percentile (in which n is [0, 5, 10 . . . 50 . . . 90, 100]).

Supervise Training of Model

In an embodiment, the classification step S510 uses a Random Forest method such as the method implemented in the machine learning module of a Python library. Other languages such as MATLAB®, R, etc. and their corresponding machine learning libraries may also be used instead of and/or in addition to python in the classification step S510. The Random Forest method is an example of a Supervised Machine Learning method that may be configured to determine if an image contains extrusion defects and/or non-fill defects or no defects based on the set R of statistical values and the computer vision parameter $C_P$. The outputs of the image preprocessing subprocess 500a become a feature space for an Artificial Intelligence approach for classifying an image 448 as containing a defect or not containing a defect.

Other machine learning methods may be used for classifying images based characteristics of the images. A non-limiting list of methods that may be used for classification are: a Bayes Classifier; Artificial Neural Network; Decision Tree; Support Vector Machine. The classification method is any trainable method which receives as an input the outputs of an image preprocessing subprocess 500a and an image classification indicating the presence or not of a defect in the image based on Model information. The Model information comes from training the supervised learning method with previously classified images that have also have outputs associated with image preprocessing subprocess 500a.

FIG. 5D is an illustration of a training method 510T for generating the Model information used by the classification step S510. The training method 510T requires as an input a set of input images 548 of N input images (548$_1$ . . . 548$_j$ . . . 548$_N$). Each input image 548$_j$ has a set of initial input data $I_j$ including expert labels) associated with it. The set of input data includes at least at least one element (an expert label) for each input image 548$_j$ classifying the input image 548$_j$ as containing an extrusion defect, a non-fill defect, or no defect. The set of initial input data may also include one or more of: feature information $I_{F,j}$; a position of the input image 548$_j$ on the substrate 102; and information about the imprinting process used to create the imprinted film 424 that is represented by the input image 548$_j$. In an embodiment, each input image 584$_j$ has an expert label associated with it that is include in the input data $I_j$, in which the expert label identifies the ROI in the input image 584$_j$ as containing a defect or no defect. In an embodiment, the expert label may also identify the type of defect as an extrusion defect or a non-fill defect.

A first step of the training method 510T is to use the image preprocessing subprocess 500a on each input image 548$_j$ in the set of input images 548 to obtain a set $R_j$ of statistical values and a computer vision parameter $C_{P,j}$ for each input image 548$_j$. In an embodiment, the image preprocessing subprocess 500a may make use of information in the set of initial input data $I_j$ such as the feature information $I_{F,j}$. In an embodiment, one or more values in the set of initial input data $I_j$ may be added to the set $R_j$ of statistical values.

The training method 510T includes a training step S538 to train the classifier used in the classification step S510. In general, a machine learning method includes a training process in which the input is training data and the output is a Model which is the then used by the machine learning method to classify subsequent unseen data. In an embodiment, the training data is not an image but is instead specific statistical characteristics of the image, such as those in sets $R_j$ of statistical values; and computer vision parameters $C_{P,j}$. Each of the machine learning libraries (for example sklearn.ensemble or tensorflow) include a process which can be used to the train the Random Forest model in the process implemented in that library. Exemplary illustrations of methods of implementing such processes are the open source methods RandomForestClassifier.fit and RandomForestClassifier.predict of the sklearn.ensemble library. In an embodiment, an input for the training step S538 is a feature vector and the expert labels (otherwise known as target values or class labels).

In the context of the present disclosure, the feature vector includes information that is output by the image preprocessing subprocess 500a for the set of input images 548 such as: a plurality of the sets $R_j$ of statistical values; and a plurality of computer vision parameters $C_{P,j}$.

In the context of the present disclosure, the expert labels are the image classifications of each of the input images $584_j$ from the set of initial input data $I_j$. In an embodiment, an operator may classify a plurality of images by visually inspecting them for defects to provide the image classification information in the set of initial input data $I_j$. In an alternative embodiment, the image classification information may be obtained through an iterative approach (reinforcement learning) that is combination of machine learning and visual inspection by an operator. In an embodiment, the expert label is selected from the group consisting of: no defect; extrusion; non-fill; extrusion and non-fill.

In an embodiment, a single model may be trained to analyze all of the images in the set of input images 548, if the marks are similar enough to make model generation possible. In an embodiment, the set of input images 548 is divided into subsets of images based on the feature information $I_F$. For example, the input images may be divided into the image subsets ($548_{edge}$; $548_{mark}$; . . . $548_N$) one for one or more of each type of feature identified by the feature information $I_F$. A plurality of models ($model_{edge}$; $model_{mark}$; . . . $model_N$) are then generated in the training step S538 for each subset of input images 548. The classification step S510 then uses the appropriate model among the plurality of models based on the feature information $I_F$. In an alternative embodiment, a model is generated for each type of feature.

Generating Imprinting Process Parameters

An embodiment may be a method of generating imprinting process parameters 700 that uses the imprinting process 300 and the image classification method 500 together to determine a set of imprinting parameters that meet a quality goal. The method of generating imprinting process parameters 700 may start with the imprinting process 300 which is used to produce a plurality of imprinted films 424 one on or more substrates using an initial set of imprinting parameters. In a step S702A a set of images 748 are generated which are representative of those imprinted films 424.

The method of generating imprinting process parameters 700 may then use the image classification method 500 to generate a set of image classification data about each of the set of images 748.

The method of generating imprinting process parameters 700 may include a testing step S704 in which the set of image classification data may then be tested to determine if the imprinted films 424 meet the quality goal. The quality goal may be based on a single criteria or on multiple criteria. A non-limiting list of exemplary criteria are: number of non-fill defects are below a non-fill defect threshold; number of extrusion defects are below an extrusion defect threshold; percent area of imprinted field that includes a defect is below a defect threshold; percent area of substrate that includes a defect is below a defect threshold; percent area of images that includes a defect is below a defect threshold; percent area of region of substrate that will become a device that includes a defect is below a defect threshold; etc.

If the answer to the testing step S704, is no, then the method of generating imprinting process parameters 700 may include a setting step S706. In the setting step S706, new imprinting parameters are set based on the set of image classifications. The locations of defects and the type of defect will determine how the imprinting parameters are adjusted.

After the new imprinting parameters are set, new films are imprinted using the imprinting process 300 and the method 700 returns to step S702 repeating the series of steps until the imprinted films meet the quality goal has determined by step S704. Once imprinting parameters meet the quality criteria, the imprinting parameters that meet the quality criteria are output as production imprinting parameters. The production imprinting parameters are then used to imprint a plurality of production substrates using process 300 which are then processed in processing step S312 so as to manufacture a plurality of articles on each substrate.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

The invention claimed is:

1. A method of analyzing an image comprising:
   selecting a computer vision parameter for an image feature identification process, wherein the image feature identification process identifies at least one feature in the image when using the computer vision parameter, wherein selecting the computer vision parameter includes steps of:
   (a) performing the image feature identification process on the image with a tentative computer vision parameter to identify a tentative number of connected features in the image;
   (b) in a first case wherein the tentative number of connected features meets a number of features criteria, setting the computer vision parameter to the tentative computer vision parameter;
   (c) in a second case wherein the tentative number of connected features does not meet the number of features criteria, performing steps (a) and (b) with a new tentative computer vision parameter until new tentative number of connected features meets the number of features criteria;
   segmenting the image into a region of interest T and a background region B;
   calculating a set of statistical values about the region of interest T of the image;
   classifying the image based on both the computer vision parameter and the set of statistical values as one of either: a defect containing image or a defect free image.

2. The method according to claim 1, wherein the image is of a portion of an imprinted film on a substrate.

3. The method according to claim 1, wherein the defect containing image is further classified as one of:
   an extrusion type image containing a representation of at least one extrusion defect;
   a non-fill type image containing a representation of at least one non-fill defect; and
   a mixed type image containing representations of the at least one non-fill defect and the at least one extrusion defect.

4. The method according to claim 1, wherein classifying the image makes use of an artificial intelligence model that uses: the computer vision parameter and set of statistical values as inputs for classification; and uses a set of input images that have been previously classified for training the artificial intelligence model.

5. The method according to claim 4, wherein the artificial intelligence model is a random forest model.

6. A method of analyzing an image comprising:
   selecting a computer vision parameter for an image feature identification process, wherein the image feature identification process identifies at least one feature in the image when using the computer vision parameter;
   segmenting the image into a region of interest T and a background region B;
   calculating a set of statistical values about the region of interest T of the image, wherein the set of statistical values includes one or more of:

$$R_1 = \max_{\text{across } i} \left( \max_{\text{feature at location } i} (ROIT) - \median_{\text{feature at location } i} (ROIT) \right)$$

$$R_2 = \max_{\text{across } i} \left( \median_{\text{feature at location } i} (ROIT) - \min_{\text{feature at location } i} (ROIT) \right)$$

$$R_3 = \min_{\text{across } i} \left( \median_{\text{feature at location } i} (ROIT) \right)$$

$$R_4 = \max_{\text{across } i} \left( \median_{\text{feature at location } i} (ROIT) \right)$$

$$R_5 = \median_{\text{across multiple images}} \left( \max_{\text{entire ROIT}} (ROIT) - \median_{\text{entire ROIT}} (ROIT) \right)$$

$$R_6 = \median_{\text{across multiple images}} \left( \median_{\text{entire ROIT}} (ROIT) - \min_{\text{entire ROIT}} (ROIT) \right)$$

$$R_7 = \median_{\text{across multiple images}} (R_3)$$

$$R_8 = \median_{\text{across multiple images}} (R_4).$$

classifying the image based on both the computer vision parameter and the set of statistical values as one of either: a defect containing image or a defect free image.

7. The method according to claim 1, wherein the image feature identification process includes a Canny edge detection process and the computer vision parameter is a canny threshold.

8. The method according to claim 1, wherein the number of features criteria is that the tentative number of connected features is 1.

9. A method of analyzing an image comprising:
   selecting a computer vision parameter for an image feature identification process, wherein the image feature identification process identifies at least one feature in the image when using the computer vision parameter;
   segmenting the image into a region of interest T and a background region B;
   before segmenting the image, receiving information about the image identifying a type of feature that is in the region of interest T;
   wherein the type of feature is selected from a group consisting of: a mark; a straight edge; and a curved edge;
   wherein segmenting the image comprises the steps:
      estimating a feature location of the type of feature in the image;
      forming a set of statistical values associated with a set of offset locations that are offset from the feature location;
      for each statistical value in the set of statistical values, calculating a particular statistical value of a particular portion of the image in a shape corresponding to the type of feature, at each offset location among the set of offset locations;
      calculating an absolute difference in statistical values between neighboring offset locations for each offset location among the set of offset location;
      identifying a subset of offset locations $S_T$ of the set of offset locations as those in which the absolute difference in statistical values is above a threshold; and
      setting bounds of the region of interest in the image as the shape corresponding to the type of feature at the subset of offset locations $S_T$;
   calculating a set of statistical values about the region of interest T of the image; and
   classifying the image based on both the computer vision parameter and the set of statistical values as one of either: a defect containing image or a defect free image.

10. The method according to claim 9, wherein the shape corresponding to the type of feature is selected from the group consisting of: a straight edge; a rectangle; a square; a corner; and a sigmoid curve.

11. A method of generating process parameters for an imprinting process comprising:
   (a) imprinting a plurality of films on one or more substrates with a set of imprinting parameters;
   (b) obtaining a set of images of the plurality of films;
   (c) generating a set of classifications of the imprinted films by analyzing the set of images in accordance with claim 9;
   (d) determining if the set of classifications of the imprinted films meet the quality goal;
   (e) in a first case wherein the set of classifications of the imprinted films do not meet the quality goal, adjusting the imprinting parameters based on the set image classifications and repeating processes (a)-(e) until the imprinting films meet the quality goal; and
   (f) in a second case wherein the set of classifications of the imprinted films do meet the quality goal, outputting the imprinting parameters in which the set of classifications of the imprinted films do meet the quality goal as production imprinting parameters.

12. A method of manufacturing an article using the production imprinting parameters output in accordance with claim 11, comprising:
   imprinting a plurality of production films on a plurality of production substrates with a set of the production imprinting parameters; and
   processing the plurality of production substrates to produce a plurality of the articles.

13. A system comprising:
   a processor;
   a memory containing instructions that, when executed by the processor, cause the processor to perform operations comprising:
      selecting a computer vision parameter for an image feature identification process, wherein the image feature identification process identifies at least one feature in an image when using the computer vision parameter, wherein selecting the computer vision parameter includes steps of:
(a) performing the image feature identification process on the image with a tentative computer vision parameter to identify a tentative number of connected features in the image;
(b) in a first case wherein the tentative number of connected features meets a number of features criteria, setting the computer vision parameter to the tentative computer vision parameter;
(c) in a second case wherein the tentative number of connected features does not meet the number of features criteria, performing steps (a) and (b) with a new tentative computer vision parameter until new tentative number of connected features meets the number of features criteria;

segmenting the image into a region of interest T and a background region B;

calculating a set of statistical values about the region of interest T of the image;

classifying the image based on both the computer vision parameter and the set of statistical values as one of either: a defect containing image or a defect free image.

14. The system according to claim 13, wherein the image is of a portion of an imprinted film further comprising:
a nanoimprint lithography system configured to form the imprinted film on a substrate.

15. The system according to claim 14, wherein imprinting parameters used by the nanoimprint lithography system to produce a production imprinted film on a plurality of production substrates is based on the classification of the image.

16. A method of manufacturing an article using production imprinting parameters generated for an imprinting process, wherein generation of the production imprinting parameters is based on analyzing the set of images in accordance with claim 1.

17. A method of manufacturing an article using production imprinting parameters generated for an imprinting process, wherein generation of the production imprinting parameters is based on analyzing the set of images in accordance with claim 6.

* * * * *